United States Patent
Mak

(10) Patent No.: US 11,803,628 B2
(45) Date of Patent: Oct. 31, 2023

(54) SECURE AUTHORIZATION VIA MODAL WINDOW

(71) Applicant: Magic Leap, Inc., Plantation, FL (US)

(72) Inventor: Genevieve Mak, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 77 days.

(21) Appl. No.: 16/894,170

(22) Filed: Jun. 5, 2020

(65) Prior Publication Data

US 2020/0401687 A1 Dec. 24, 2020

Related U.S. Application Data

(60) Provisional application No. 62/890,849, filed on Aug. 23, 2019, provisional application No. 62/864,752, filed on Jun. 21, 2019.

(51) Int. Cl.
*G06F 3/01* (2006.01)
*G06T 19/00* (2011.01)
(Continued)

(52) U.S. Cl.
CPC ............. *G06F 21/36* (2013.01); *G06F 3/011* (2013.01); *G06F 3/012* (2013.01); *G06F 21/31* (2013.01);
(Continued)

(58) Field of Classification Search
CPC .......... G06F 21/36; G06F 3/011; G06F 3/012; G06F 21/31; G06F 21/33; G06F 2203/04804; G06T 19/006
See application file for complete search history.

(56) References Cited

U.S. PATENT DOCUMENTS 6,850,221 B1 2/2005 Tickle
9,882,892 B1 * 1/2018 Vogel .................. H04L 63/083
(Continued)

FOREIGN PATENT DOCUMENTS

WO WO 2015/192117 12/2015
WO 2018204281 A1 11/2018
WO WO 2020/256973 12/2021

OTHER PUBLICATIONS

International Search Report and Written Opinion for PCT Application No. PCT/US2020/036467, dated Sep. 3, 2020.
(Continued)

*Primary Examiner* — Rami R Okasha
(74) *Attorney, Agent, or Firm* — Tobias Intellectual Property Law, PLLC

(57) ABSTRACT

The disclosure relates to systems and methods for authorization of a user in a spatial 3D environment. The systems and methods can include receiving a request from an application executing on a mixed reality display system to authorize the user with a web service, displaying to the user an authorization window configured to accept user input associated with authorization by the web service and to prevent the application or other applications from receiving the user input, communicating the user input to the web service, receiving an access token from the web service, in which the access token is indicative of successful authorization by the web service, and communicating the access token to the application for authorization of the user. The authorization window can be a modal window displayed in an immersive mode by the mixed reality display system.

19 Claims, 30 Drawing Sheets

(51) Int. Cl.
  *G06F 21/31* (2013.01)
  *G06F 21/33* (2013.01)
  *G06F 21/36* (2013.01)
(52) U.S. Cl.
  CPC ............ *G06F 21/33* (2013.01); *G06T 19/006* (2013.01); *G06F 2203/04804* (2013.01)

(56) References Cited

U.S. PATENT DOCUMENTS

| | | | |
|---|---|---|---|
| 9,892,251 B2* | 2/2018 | Park | H04W 12/08 |
| 10,686,600 B1* | 6/2020 | Vo | H04L 63/105 |
| 10,855,674 B1* | 12/2020 | Geusz | H04L 63/20 |
| 11,070,540 B1* | 7/2021 | Singh | H04L 63/0815 |
| 2006/0028436 A1 | 2/2006 | Armstrong | |
| 2007/0081123 A1 | 4/2007 | Lewis | |
| 2012/0058774 A1 | 3/2012 | Kim | |
| 2012/0127062 A1 | 5/2012 | Bar-Zeev et al. | |
| 2012/0162549 A1 | 6/2012 | Gao et al. | |
| 2012/0235900 A1 | 9/2012 | Border et al. | |
| 2013/0082922 A1 | 4/2013 | Miller | |
| 2013/0117377 A1 | 5/2013 | Miller | |
| 2013/0125027 A1 | 5/2013 | Abovitz | |
| 2013/0208234 A1 | 8/2013 | Lewis | |
| 2013/0242262 A1 | 9/2013 | Lewis | |
| 2014/0020070 A1 | 1/2014 | Angal et al. | |
| 2014/0071539 A1 | 3/2014 | Gao | |
| 2014/0073293 A1* | 3/2014 | Kimura | H04W 12/06 455/411 |
| 2014/0125574 A1 | 5/2014 | Scavezze et al. | |
| 2014/0173711 A1* | 6/2014 | Zlatarev | H04L 63/0815 726/8 |
| 2014/0177023 A1 | 6/2014 | Gao et al. | |
| 2014/0218468 A1 | 8/2014 | Gao et al. | |
| 2014/0267420 A1 | 9/2014 | Schowengerdt | |
| 2015/0016777 A1 | 1/2015 | Abovitz et al. | |
| 2015/0089622 A1* | 3/2015 | Sondhi | H04L 63/08 726/9 |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0309263 A2 | 10/2015 | Abovitz et al. | |
| 2015/0326570 A1 | 11/2015 | Publicover et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0293133 A1 | 10/2016 | Dutt | |
| 2017/0316186 A1 | 11/2017 | Breitenfeld et al. | |
| 2018/0190026 A1* | 7/2018 | Barnett | G06T 11/60 |
| 2018/0315248 A1 | 11/2018 | Bastov et al. | |
| 2018/0341760 A1* | 11/2018 | Frempong | H04W 12/61 |
| 2018/0351958 A1* | 12/2018 | Sakurai | H04L 63/102 |
| 2018/0365405 A1 | 12/2018 | Mistry | |
| 2019/0158569 A1* | 5/2019 | Singleton, IV | H04L 67/10 |
| 2019/0197785 A1 | 6/2019 | Tate-Gans et al. | |
| 2019/0230080 A1* | 7/2019 | Boothby | G06Q 20/4014 |
| 2019/0340816 A1* | 11/2019 | Rogers | H04L 67/22 |
| 2020/0304501 A1* | 9/2020 | Fan | G06Q 20/12 |

OTHER PUBLICATIONS

International Preliminary Report on Patentability for PCT Application No. PCT/US2020/036467, dated Dec. 21, 2021.
ARToolKit: https://web.archive.org/web/20051013062315/http://www.hitl.washington.edu:80/artoolkit/documentation/hardware.htm, archived Oct. 13, 2005.
Azuma, "a Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bates, "Modal and Modeless Boxes in Web Design," May 2, 2012, https://webdesign.tutsplus.com/articles/modal-and-modeless-boxes-in-web-design--webdesign-2282. Downloaded Jul. 24, 2019 in 26 pages.
Bimber, et al., "Spatial Augmented Reality—Merging Real and Virtual Worlds," 2005 https://web.media.mit.edu/~raskar/book/BimberRaskarAugmentedRealityBook.pdf.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).
EP20827586.7 Extended European Search Report dated Jun. 15, 2023.

* cited by examiner

| Element ID | Preference | Parent Element ID | Child Element ID | Multiple Entity |
|---|---|---|---|---|
| 220 | Main | 260 | 230 | N |
| 230 | Horizontal | 220 | | Y |
| 240 | Vertical | | | Y |
| 250 | Secondary Tab | | | Y |
| 260 | Main Tab | | 220 | N |
| * * * | | | | |

FIG. 5

| Surface ID | W | H | Orientation | Real / Virtual | Multiple | Position (center of surface) | ... |
|---|---|---|---|---|---|---|---|
| 182 | 48 | 36 | Vertical | R | Single | $(2.5, 2.3, 1.2)_{user}$ | |
| 192 | 24 | 24 | Horizontal | R | Single | $(x, y, z)_{user}$ | |
| 186 | 24 | 36 | Vertical | R | Single | $(1.3, 2.3, 1.3)_{world}$ | |
| 190 | 12 | 12 | Vertical | V | Multiple | $(x, y, z)_{182}$ | |
| 194 | 16 | 16 | Horizontal | V | Multiple | $(x, y, z)_{frame}$ | |
| *** | | | | | | | |

| Element ID | Surface ID | * * * |
|---|---|---|
| 220 | 182 | |
| 230 | 192 | |
| 240 | 186 | |
| 250 | 190 | |
| * * * | | |

*FIG. 9*

SECURE AUTHORIZATION VIA MODAL WINDOW

PRIORITY CLAIM

This application is a non-provisional of and claims priority to U.S. Provisional Application No. 62/864,752, filed Jun. 21, 2019, entitled "BROWSER FOR MIXED REALITY SYSTEM," and U.S. Provisional Application No. 62/890,849, filed Aug. 23, 2019, entitled "SECURE AUTHORIZATION VIA MODAL WINDOW," each of which are hereby incorporated by reference in their entireties.

BACKGROUND

Field

The disclosure relates generally to systems and methods for implementing technology in a spatial three-dimensional (3D) environment and more specifically to navigation or manipulation of virtual content in a 3D mixed, augmented, or virtual reality environment.

Background

A typical way to view a web page is to open the web page on a monitor of a computer, smartphone, tablet, etc. A user would scroll through the web page to view the different content displayed on the web page. Normally, whether the user is looking at the computer monitor, smartphone or tablet, there is a fixed format as to how the content is displayed on the monitor. Challenges exist for viewing web pages in a 3D environment.

SUMMARY

Improved systems and methods are provided for navigation and manipulation of virtual content in a 3D mixed reality environment. The systems and methods can provide for authorization of a user in the spatial 3D environment. For example, the systems and methods can include receiving a request from an application executing on a mixed reality display system to authorize the user with a web service, such as a single sign on (SSO) web service configured to authorize the user to use multiple applications and/or other web services via the mixed reality display system. In some embodiments, the authorization web service displays to the user an authorization window configured to accept user input associated with authorization by the web service and to prevent the application or other applications from receiving the user input, communicating the user input to the web service, receiving an access token from the web service, in which the access token is indicative of successful authorization by the web service, and communicating the access token to the application for authorization of the user. The authorization window can be a modal window displayed in an immersive mode by the mixed reality display system.

BRIEF DESCRIPTION OF THE DRAWINGS

The drawings illustrate the design and utility of various implementations of the present disclosure. It should be noted that the figures are not drawn to scale and that elements of similar structures or functions are represented by like reference numerals throughout the figures. In order to better appreciate how to obtain the above-recited and other advantages and objects of various implementations of the disclosure, a more detailed description of the present disclosure briefly described above will be rendered by reference to specific implementations thereof, which are illustrated in the accompanying drawings. Understanding that these drawings depict only typical implementations of the disclosure and are not therefore to be considered limiting of its scope, the disclosure will be described and explained with additional specificity and detail through the use of the accompanying drawings in which:

FIG. 5 shows an example of a table to store elements deconstructed from a 2D content, according to some implementations.

FIG. 7 shows an example of a table to store an inventory of surfaces identified from a user's local environment, according to some implementations.

FIG. 9 shows an example of a table to store the mapping of elements from a 2D content to surfaces from a user's local environment, according to some implementations.

DETAILED DESCRIPTION

Figure 1:
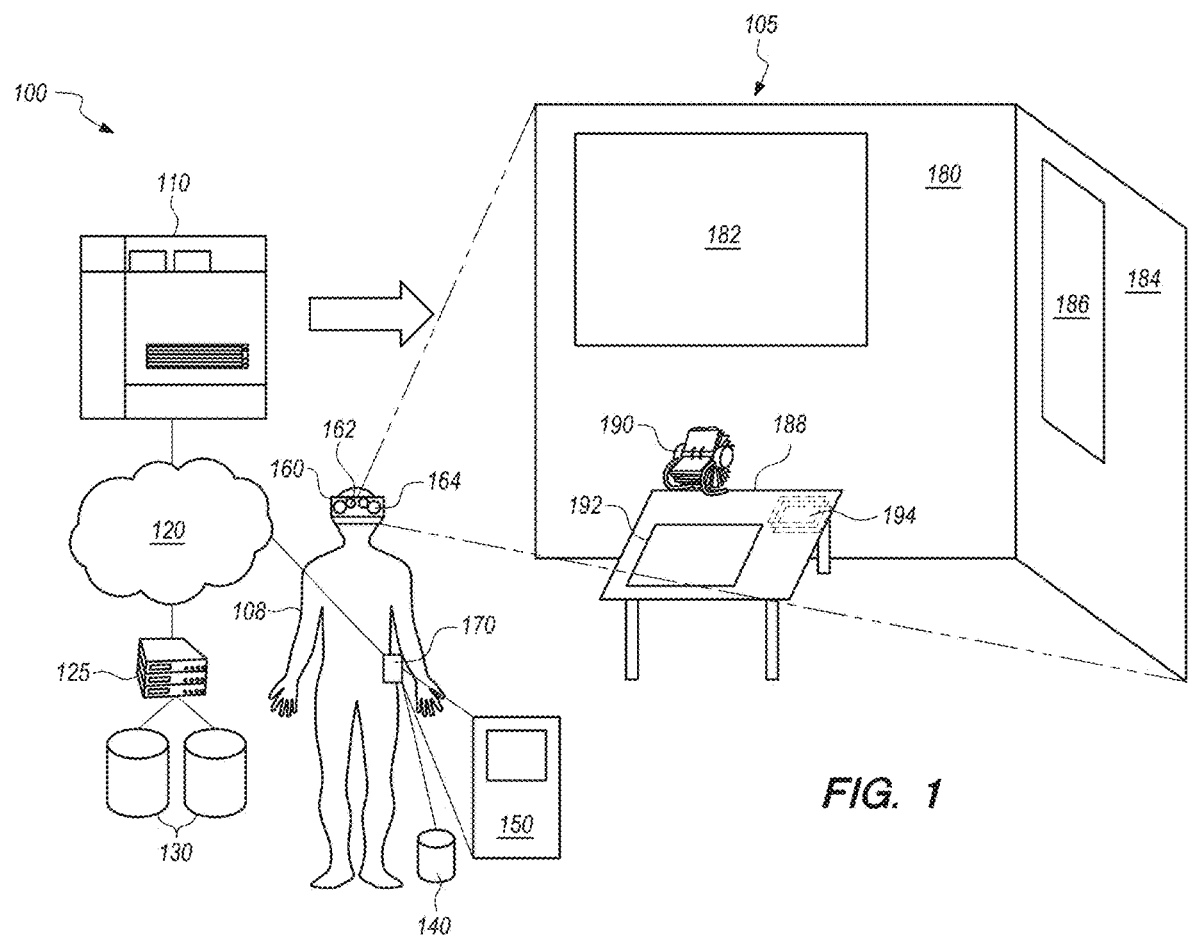
FIG. 1 illustrates an augmented reality environment for deconstructing 2D content to be displayed in a user's 3D environment, according to some implementations.

Various implementations will now be described in detail with reference to the drawings, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various implementations encompass present and future known equivalents to the components referred to herein by way of illustration.

Although the systems and methods as described below are primarily described within the context of browser applications, one of ordinary skill in the art would understand that the systems and methods described herein may also be applied within the context of one or more other applications as well. In some implementations, an application for managing a user's photos and/or videos may utilize the systems and methods described below. In some implementations, an application for playing card games may utilize the systems and methods described below. In some implementations, a weather application may utilize the systems and methods described below. In some implementations, any other application that may be installed and/or run on a device and/or system capable of displaying 3D virtual content to a user may utilize the systems and methods described below. In some implementations, a single application may utilize the systems and methods described below. In some implementations, more than one application may utilize the systems and methods described below. In some implementations, all applications installed and/or run on the device and/or system capable of displaying 3D virtual content to a user may utilize the systems and methods described below. In some implementations, multiple instances of an application may utilize the systems and methods described below.

Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Modal Window:

a graphical window (and/or other user interface element) this is displayed in the foreground (e.g., on top of a main window of a parent application). Display of a modal window may allow at least some of a parent application to remain visible (e.g., portions surrounding the modal window), but the user must interact with the modal window before they can return to the parent application.

Web Service:

a service that is made available via a network. Web services may use various communication models for communicating with network-connected devices. For example, some web services use SOAP messages, which may be transmitted using HTTP with XML, for example. One example of a web service is a single sign on (SSO) service, which is generally configured to authorize a user with reference to multiple applications (or other web services), so that each of the multiple applications (or other web services) do not need to provide a separate user authentication. An SSO service may be provide in various manners, such as via an Open Authorization (OAuth), Security Assertion Markup Language (SAML), and/or other service. While specific authentication services are discussed in the example embodiments herein, other authentication services may also be used.

Web Page Deconstruction

With virtual reality, augmented reality, and/or mixed reality systems (hereinafter collectively referred to as "mixed reality" systems), a three dimensional environment is provided for the display of content to a user. Conventional approaches to display 2D content within browsers do not work very well when used in a 3D environment. One reason for this is because, with conventional 2D web browsers, the display area of the display device is limited to the screen area of a monitor that is displaying the content. As a result, conventional browsers are configured to only know how to organize and display content within that monitor display area. In contrast, 3D environments are not limited to the strict confines of the monitor display area. Therefore, conventional 2D browsers perform sub-optimally when used in a 3D environment since conventional browsing technologies do not have the functionality or capability to take advantage of the 3D environment for displaying content.

For example, consider the situation when a user is using mixed reality equipment and has placed multiple browser windows that are associated with different physical locations. For instance, the user may have opened a first browser window in a first room and a second browser window while in a second room. Since conventional 2D-based browsers are limited to the display of a given monitor area, this means that conventional browsers do not even have technology to comprehend the idea of physically remote windows, much less the ability to handle this situation with multiple windows open in multiple physical locations, making it impossible for a user to effectively view, navigate to, and use these multiple windows.

Therefore, there is a need for an improved approach to implement browsing technology in a 3D environment.

Implementations of the disclosure deconstruct a 2D web page to be displayed in a spatially organized 3D environment. The 2D web page may originate on a web browser of a head-mounted system, a mobile device (e.g., cell phone), a tablet, a television, an application, and the like. In some implementations, the 2D web page may be received from another application or device such as a laptop computer, a desktop computer, an email application with a link to the 2D web page, an electronic message referencing or including a link to the 2D web page and the like.

Referring to Figure (FIG. 1, environment 100 is representative of a physical environment and systems for implementing processes described below (e.g., deconstructing 2D content from a web page to be displayed on 3D surfaces in a user's physical environment 105 or providing authentication or authentication for applications or for providing modal browser windows). The representative physical environment and system of the environment 100 includes a user's physical environment 105 as viewed by a user 108 through a head-mounted system 160. The representative system of the environment 100 further includes accessing a 2D content (e.g., a web page) via a web browser 110 operably coupled to a network 120. The network 120 may be the Internet, an internal network, a private cloud network, a public cloud network, etc. The web browser 110 is also operably coupled to a processor 170 via the network 120.

Although the processor 170 is shown as an isolated component separate from the head-mounted system 160, in an alternate implementation, the processor 170 may be integrated with one or more components of the head-mounted system 160, and/or may be integrated into other system components within the environment 100 such as, for example, the network 120 to access a computing network 125 and storage devices 130. The processor 170 may be configured with software 150 for receiving and processing information such as video, audio and content received from the head-mounted system 160, a local storage device 140, the web browser 110, the computing network 125, and the storage devices 130. The software 150 may communicate with the computing network 125 and the storage devices 130 via the network 120. The software 150 may be installed on the processor 170 or, in another implementation; the features and functionalities of software may be integrated into the processor 170. The processor 170 may also be configured with the local storage device 140 for storing information used by the processor 170 for quick access without relying on information stored remotely on an external storage device from a vicinity of the user 108. In other implementations, the processor 170 may be integrated within the head-mounted system 160.

The user's physical environment 105 is the physical surroundings of the user 108 as the user moves about and views the user's physical environment 105 through the head-mounted system 160. For example, referring to FIG. 1, the user's physical environment 105 shows a room with two walls (e.g., main wall 180 and side wall 184, the main wall and side wall being relative to the user's view) and a table 188. On the main wall 180, there is a rectangular surface 182 depicted by a solid black line to show a physical surface with a physical border (e.g., a painting hanging or attached to a wall or a window, etc.) that may be a candidate surface to project certain 2D content onto. On the side wall 184, there is a second rectangular surface 186 depicted by a solid black line to show a physical surface with a physical border (e.g., a painting hanging or attached to a wall or a window, etc.). On the table 188, there may be different objects. 1) A virtual Rolodex 190 where certain 2D content may be stored and displayed; 2) a horizontal surface 192 depicted by a solid black line to represent a physical surface with a physical border to project certain 2D content onto; and 3) multiple stacks of virtual square surfaces 194 depicted by a dotted black line to represent, for example, stacked virtual newspaper where certain 2D content may be stored and displayed.

The web browser 110 may also display a blog page from the internet or within an intranet or private network. Additionally, the web browser 110 may also be any technology that displays digital 2D content. 2D content may include, for example, web pages, blogs, digital pictures, videos, news articles, newsletters, or music. The 2D content may be stored in the storage devices 130 that are accessible by the user 108 via the network 120. In some implementations, 2D content may also be streaming content, for example, live video feeds or live audio feeds. The storage devices 130 may include, for example, a database, a file system, a persistent memory device, a flash drive, a cache, etc. In some implementations, the web browser 110 containing 2D content (e.g., web page) is displayed via computing network 125.

The computing network 125 accesses the storage devices 130 to retrieve and store 2D content for displaying in a web page on the web browser 110. In some implementations, the local storage device 140 may provide 2D content of interest to the user 108. The local storage device 140 may include, for example, a flash drive, a cache, a hard drive, a database, a file system, etc. Information stored in the local storage device 140 may include recently accessed 2D content or recently displayed content in a 3D space. The local storage device 140 allows improvements in performance to the systems of the environment 100 by providing certain content locally to the software 150 for helping to deconstruct 2D content to display the 2D content on the 3D space environment (e.g., 3D surfaces in the user's physical environment 105).

The software 150 includes software programs stored within a non-transitory computer readable medium to perform the functions of deconstructing 2D content to be displayed within the user's physical environment 105. The software 150 may run on the processor 170 wherein the processor 170 may be locally attached to the user 108, or in some other implementations, the software 150 and the processor 170 may be included within the head-mounted system 160. In some implementations, portions of the features and functions of the software 150 may be stored and executed on the computing network 125 remote from the user 108. For example, in some implementations, deconstructing 2D content may take place on the computing network 125 and the results of the deconstructions may be stored within the storage devices 130, wherein the inventorying of a user's local environment's surfaces for presenting the deconstructed 2D content on may take place within the processor 170 wherein the inventory of surfaces and mappings are stored within the local storage device 140. In one implementation, the processes of deconstructing 2D content, inventorying local surfaces, mapping the elements of the 2D content to local surfaces and displaying the elements of the 2D content may all take place locally within the processor 170 and the software 150.

The head-mounted system 160 may be a virtual reality (VR) or augmented reality (AR) head-mounted system that includes a user interface, a user-sensing system, an environment sensing system, and a processor (all not shown). The head-mounted system 160 presents to the user 108 an interface for interacting with and experiencing a digital world. Such interaction may involve the user and the digital world, one or more other users interfacing the environment 100, and objects within the digital and physical world.

The user interface may include receiving 2D content and selecting elements within the 2D content by user input through the user interface. The user interface may be at least one or a combination of a haptics interface devices, a keyboard, a mouse, a joystick, a motion capture controller, an optical tracking device and an audio input device. A haptics interface device is a device that allows a human to interact with a computer through bodily sensations and movements. Haptics refers to a type of human-computer interaction technology that encompasses tactile feedback or other bodily sensations to perform actions or processes on a computing device. In some implementations, the control interface may be a user interface, such that the user may interact with the MR display system, for example by providing a user input to the system and the system responding by executing a corresponding command.

The user-sensing system may include one or more sensors 162 operable to detect certain features, characteristics, or information related to the user 108 wearing the head-mounted system 160. For example, in some implementations, the sensors 162 may include a camera or optical detection/scanning circuitry capable of detecting real-time optical characteristics/measurements of the user 108 such as, for example, one or more of the following: pupil constriction/dilation, angular measurement/positioning of each pupil, spherocity, eye shape (as eye shape changes over time) and other anatomic data. This data may provide, or be used to calculate information (e.g., the user's visual focal point) that may be used by the head-mounted system 160 to enhance the user's viewing experience.

The environment-sensing system may include one or more sensors 164 for obtaining data from the user's physical environment 105. Objects or information detected by the sensors 164 may be provided as input to the head-mounted system 160. In some implementations, this input may represent user interaction with the virtual world. For example, a user (e.g., the user 108) viewing a virtual keyboard on a desk (e.g., the table 188) may gesture with their fingers as if the user was typing on the virtual keyboard. The motion of the fingers moving may be captured by the sensors 164 and provided to the head-mounted system 160 as input, wherein the input may be used to change the virtual world or create new virtual objects.

The sensors 164 may include, for example, a generally outward-facing camera or a scanner for interpreting scene information, for example, through continuously and/or intermittently projected infrared structured light. The environment-sensing system may be used for mapping one or more elements of the user's physical environment 105 around the user 108 by detecting and registering the local environment, including static objects, dynamic objects, people, gestures and various lighting, atmospheric and acoustic conditions. Thus, in some implementations, the environment-sensing system may include image-based 3D reconstruction software embedded in a local computing system (e.g., the processor 170) and operable to digitally reconstruct one or more objects or information detected by the sensors 164.

In one example implementation, the environment-sensing system provides one or more of the following: motion capture data (including gesture recognition), depth sensing, facial recognition, object recognition, unique object feature recognition, voice/audio recognition and processing, acoustic source localization, noise reduction, infrared or similar laser projection, as well as monochrome and/or color CMOS sensors (or other similar sensors), field-of-view sensors, and a variety of other optical-enhancing sensors. It should be appreciated that the environment-sensing system may include other components other than those discussed above.

As mentioned above, the processor 170 may, in some implementations, be integrated with other components of the head-mounted system 160, integrated with other components of system of the environment 100, or may be an isolated device (wearable or separate from the user 108) as shown in FIG. 1. The processor 170 may be connected to various components of the head-mounted system 160 through a physical, wired connection, or through a wireless connection such as, for example, mobile network connections (including cellular telephone and data networks), Wi-Fi, Bluetooth, or any other wireless connection protocol. The processor 170 may include a memory module, integrated and/or additional graphics processing unit, wireless and/or wired internet connectivity, and codec and/or firmware capable of transforming data from a source (e.g., the computing network 125, and the user-sensing system and the environment-sensing system from the head-mounted system 160) into image and audio data, wherein the images/video and audio may be presented to the user 108 via the user interface (not shown).

The processor 170 handles data processing for the various components of the head-mounted system 160 as well as data exchange between the head-mounted system 160 and 2D content from web pages displayed or accessed by web browser 110 and the computing network 125. For example, the processor 170 may be used to buffer and process data streaming between the user 108 and the computing network 125, thereby enabling a smooth, continuous and high fidelity user experience. Deconstructing 2D content from a web page into elements and mapping the elements to be displayed on surfaces in a 3D environment may be accomplished in an intelligent and logical manner. A predetermined set of rules may be available to recommend, suggest, or dictate where to place certain types of elements/content identified within a 2D content/web page. For example, certain types of 2D content elements may have one or more content elements that may need to be mapped to a physical or virtual object surface amenable for storing and displaying the one or more elements while other types of 2D content elements may be a single object, such as a main video or main article within a web page, in which case, the single object may be mapped to a surface that makes the most sense to display a single object to the user.

Figure 2:
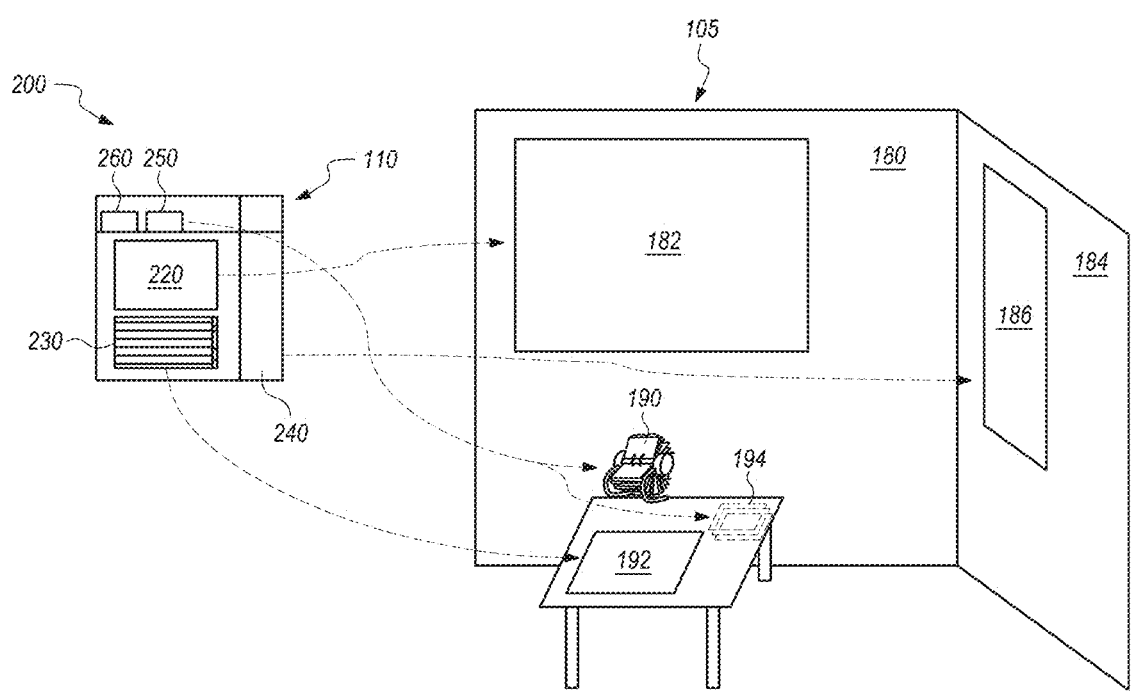
FIG. 2 illustrates an example mapping of elements of a 2D content to a user's 3D environment, according to some implementations.

FIG. 2 illustrates an example mapping of elements of a 2D content to a user's 3D environment, according to some implementations. Environment 200 depicts a 2D content (e.g., a web page) displayed or accessed by a web browser 110 and a user's physical environment 105. The dotted lines with an arrow head depict elements (e.g., particular types of content) from the 2D content (e.g., web page) that are mapped to and displayed upon the user's physical environment 105. Certain elements from the 2D content are mapped to certain physical or virtual objects in the user's physical environment 105 based on either web designer hints or pre-defined browser rules.

As an example, 2D content accessed or displayed by the web browser 110 may be a web page having multiple tabs, wherein a current active tab 260 is displayed and a secondary tab 250 is currently hidden until selected upon to display on the web browser 110. Displayed within the active tab 260 is typically a web page. In this particular example, the active tab 260 is displaying a YOUTUBE page including a main video 220, user comments 230, and suggested videos 240. As depicted in this example FIG. 2, the main video 220 may be mapped to display on vertical surface 182, the user comments 230 may be mapped to display on horizontal surface 192, and suggested videos 240 may be mapped to display on a different vertical surface 186 from the vertical surface 182. Additionally, the secondary tab 250 may be mapped to display on a virtual Rolodex 190 and/or on a multi-stack virtual object 194. In some implementations, specific content within the secondary tab 250 may be stored in the multi-stack virtual object 194. In other implementations, the entire content residing within the secondary tab 250 may be stored and/or displayed on the multi-stack virtual object 194. Likewise, the virtual Rolodex 190 may contain specific content from the secondary tab 250 or the virtual Rolodex 190 may contain the entire content residing within the secondary tab 250.

The vertical surface 182 may be any type of structure which may already be on a main wall 180 of a room (depicted as the user's physical environment 105) such as a window pane or a picture frame. In some implementations, the vertical surface 182 may be an empty wall where the head-mounted system 160 determines an optimal size of the frame of the vertical surface 182 that is appropriate for the user 108 to view the main video 220. This determination of the size of the vertical surface 182 may be based at least in part on the distance the user 108 is from the main wall 180, the size and dimension of the main video 220, the quality of the main video 220, the amount of uncovered wall space, and/or the pose of the user when looking at the main wall 180. For instance, if the quality of the main video 220 is of high definition, the size of the vertical surface 182 may be larger because the quality of the main video 220 will not be adversely affected by the vertical surface 182. However, if the video quality of the main video 220 is of poor quality, having a large vertical surface 182 may greatly hamper the video quality, in which case, the methods and systems of the present disclosure may resize/redefine the vertical surface 182 to be smaller to minimize poor video quality from pixilation.

The vertical surface 186, like the vertical surface 182, is a vertical surface on an adjacent wall (e.g., side wall 184) in the user's physical environment 105. In some implementations, based on the orientation of the user 108, the side wall 184 and the vertical surface 186 may appear to be slanted surfaces on an incline. The slanted surfaces on an incline may be a type of orientation of surfaces in addition to vertical and horizontal surfaces. The suggested videos 240 from the YOUTUBE web page may be placed on the vertical surface 186 on the side wall 184 to allow the user 108 to be able to view suggested videos simply by moving their head slightly to the right in this example.

The virtual Rolodex 190 is a virtual object created by the head-mounted system 160 and displayed to the user 108. The virtual Rolodex 190 may have the ability for the user 108 to bi-directionally cycle through a set of virtual pages. The virtual Rolodex 190 may contain entire web pages or it may contain individual articles or videos or audios. As shown in this example, the virtual Rolodex 190 may contain a portion of the content from the secondary tab 250 or in some implementations, the virtual Rolodex 190 may contain the entire page of the secondary tab 250. The user 108 may bi-directionally cycle through content within the virtual Rolodex 190 by simply focusing on a particular tab within the virtual Rolodex 190 and the one or more sensors (e.g., the sensors 162) within the head-mounted system 160 detect the eye focus of the user 108 and cycle through the tabs within the virtual Rolodex 190 accordingly to obtain relevant information for the user 108. In some implementations, the user 108 may choose the relevant information from the virtual Rolodex 190 and instruct the head-mounted system 160 to display the relevant information onto either an available surrounding surface or on yet another virtual object such as a virtual display in close proximity to the user 108 (not shown).

The multi-stack virtual object 194, similar to virtual Rolodex 190, may contain content ranging from full contents from one or more tabs or particular contents from various web pages or tabs that the user 108 bookmarks, saves for future viewing, or has open (e.g., inactive tabs). The multi-stack virtual object 194 is also similar to a real-world stack of newspapers. Each stack within the multi-stack virtual object 194 may pertain to a particular newspaper article, page, magazine issue, recipe, etc. One of ordinary skill in the art may appreciate that there can be multiple types of virtual objects to accomplish this same purpose of providing a surface to place 2D content elements or content from a 2D content source.

One of ordinary skill in the art may appreciate that 2D content accessed or displayed by the web browser 110 may be more than just a web page. In some implementations, 2D content may be pictures from a photo album, videos from movies, TV shows, YOUTUBE videos, interactive forms, etc. Yet in other implementations, 2D content may be e-books, or any electronic means of displaying a book. Finally, in other implementations, 2D content may be other types of content not yet described because 2D content is generally how information is presented currently. If an electronic device can consume a 2D content, then the 2D content can be used by the head-mounted system 160 to deconstruct and display the 2D content in a 3D setting (e.g., AR).

In some implementations, mapping the accessed 2D content may include extracting the 2D content (e.g., from the browser) and putting it on a surface (such that the content is no longer in the browser and only on the surface), and in some implementations, the mapping can include replicating content (e.g., from the browser) and putting it on a surface (such that the content is both in the browser and on the surface). Deconstructing 2D content is a technical problem that exists in the realm of the Internet and computer-related technology. 2D content such as web pages are constructed using certain types of programming languages such as HTML to instruct computer processors and technical components where and how to display elements within the web pages on a screen for a user. As discussed above, a web designer typically works within the limitation of a 2D canvas (e.g., a screen) to place and display elements (e.g., content) within the 2D canvas. HTML tags are used to determine how an HTML document or portions within the HTML document are formatted. In some implementations, the (extracted or replicated) 2D content can maintain the HTML tag reference, and in some implementations, the HTML tag reference may be redefined.

Figure 3:
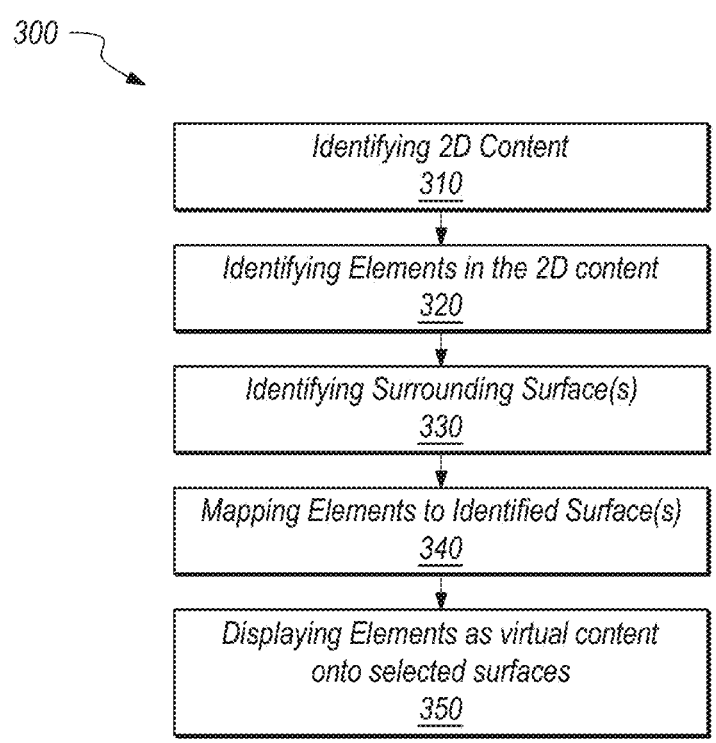
FIG. 3 is a flow diagram illustrating a method for deconstructing 2D content to be displayed in a 3D environment, according to some implementations.

FIG. 3 is a flow diagram illustrating a method for deconstructing 2D content to be displayed in a 3D environment, according to some implementations. The method includes identifying 2D content at 310, identifying elements in the 2D contents at 320, identifying surrounding surfaces at 330, mapping identified elements in the identified 2D contents to identified surfaces from the identifying surrounding surfaces at 340, and displaying elements as virtual content onto selected surfaces at 350, wherein the selected surfaces are selected from the mapping of the elements to the identified surfaces.

Identifying 2D content at 310 may involve the use of the head-mounted system 160 to search for digital content. Identifying 2D content at 310 may also include accessing digital content on servers (e.g., the storage devices 130) connected to the network 120. Identifying 2D content at 310 may include browsing the Internet for web pages that are of interest to the user 108. In some implementations, identifying 2D content at 310 may include voice-activated commands given by the user 108 for searching content on the Internet. For example, a user 108 may be interacting with a device (e.g., head-mounted system 160) wherein the user 108 is searching for a particular video on the Internet by asking the device to search for the particular video by saying a command to search for a video and then saying the name of the video and a brief description of the video. The device may then search the Internet and pull up the video on a 2D browser to allow the user 108 to see the video as displayed on the 2D browser of the device. The user 108 may then confirm that the video is a video that the user 108 would like to view in the spatial 3D environment.

Once 2D content is identified, the method identifies elements in the 2D content at 320 to take inventory of the available elements within the 2D content for displaying to the user 108. The elements within the 2D content, for example, may include videos, articles and newsletters posted on a web page, comments and postings on a social media website, blog posts, pictures posted on various websites, audio books, etc. These elements within the 2D content (e.g., a web page) may contain HTML tags having attributes associated with HTML tags provided by a content designer to define where on the web page a particular element is placed and in some cases, when and how the element is to be displayed on the web page. In some implementations, the methods and systems of the present disclosure utilize these HTML tags and attributes as hints and suggestions provided by the content designer to aid in the mapping process at 340 to determine where and how to display the element in a 3D setting. For example, below is an example HTML Web Page code provided by the web page developer.

Example HTML Web Page Code Provided by a Web Page Developer

```
/*
measurement values can be given in cm since ml objects are meant to
work in the real world environment
type : hint for preference in surface type to match to;
priority : hint for preference in getting the desired surface during
matching, with range [1,100], where 1 is low priority and 100 is top
priority. algorithm. higher value is higher priority (like z-index CSS
property);
distance-depth: for the stack layout, distance between adjacent stacked
objects;
*/
<!DOCTYPE HTML>
<html>
<head> ... </head>
<body>
...
<ml-layout id="video" layout="plane" style="type:vertical;
priority:100;">
    <ml-container width="200cm" height="120cm">
        <div id="current_video"... >
            <video ... >
            ...
            </video>
        </div>
    </ml-container>
</ml-layout>
<ml-layout id="recommendations" layout="stack" style="type:horizontal;
priority:90; distance-depth:20cm;">
    <ml-container width="50cm" height="50cm">
        <div id="video_recommendation_1">
        ...
        </div>
    </ml-container>
    <ml-container width="50cm" height="50cm">
        <div id="video_recommendation_2">
        ...
        </div>
    </ml-container>
</ml-layout>
...
</body>
</html>
```

The example HTML Web Page code provided by a web page developer includes a preference on how to display the main video on a web page, and a preference on how to display recommended (or suggested videos). In particular, this HTML web page code uses the tag of "style" to specify how to display the main video using a type value of "vertical" to designate a vertical surface to display the video. Additionally, within the "style" tag, additional hints provided by the web page developer may include a "priority" preference for a matching algorithm to use to prioritize which HTML element/content within the web page (e.g., the main video) is to be mapped to which potential surface area. In the example HTML Web Page code, the priority was set at a value of 100 for the video having a vertical plane layout, wherein in this example, a higher priority value indicates a higher priority. Additionally, in this example, a preference is indicated by the web page developer to place the suggested videos in a stack having a type value of "horizontal" in a stack layout, wherein the distance between the stacked objects (e.g., in this case, a suggested video in relation to another suggested video) is 20 cm.

Figure 4:
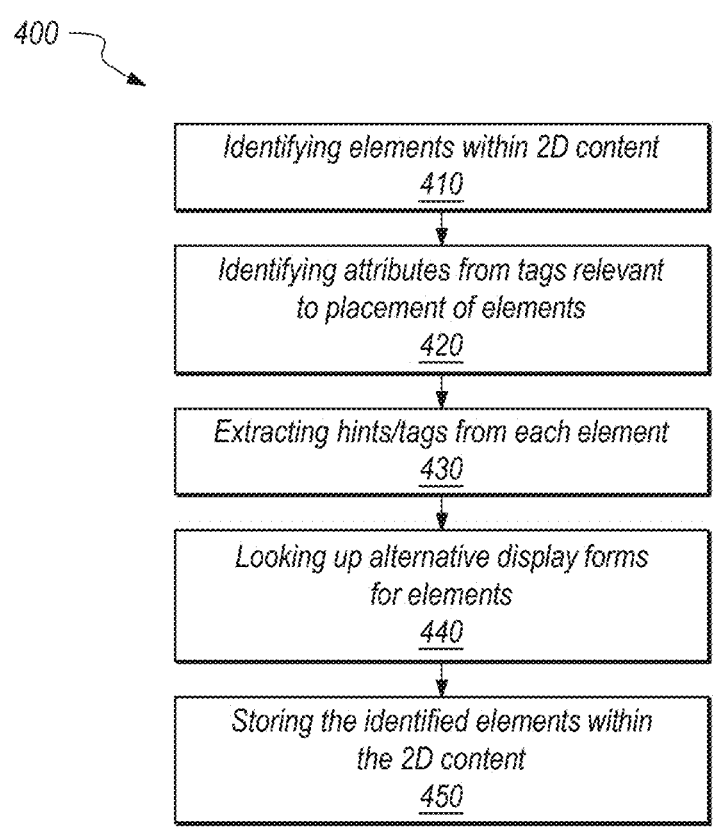
FIG. 4 is a flow diagram illustrating a method for identifying elements in a 2D content, according to some implementations.

FIG. 4 is a flow diagram illustrating a method for identifying elements in a 2D content, according to some implementations. FIG. 4 is a detailed flow disclosing identifying elements in the 2D content at 320 of FIG. 3, according to some implementation. FIG. 4 begins with identifying elements within 2D content at 410, similar to identifying elements in the 2D content at 320 of FIG. 3. The method proceeds to the next block of identifying attributes from tags pertaining to placement of content at 420. As discussed above, a web page designer, while designing and configuring a web page, may associate elements within the web page to HTML tags to define where and how to display each element. These HTML tags may also include attributes pertaining to placement of the element onto a particular portion of the web page. It is these HTML tags and their attributes that the head-mounted system 160 can detect and coordinate with other components of the system to use as input as to where the particular element could be displayed.

Extracting hints or tags from each element is performed at 430. The hints or tags are typically formatting hints or formatting tags that are provided by the content designer of the 2D content/web page and/or a web page developer. As discussed above, the content designer may provide instructions or hints, for example, in the form of HTML tags as shown in the "Example HTML Web Page code provided by the web page developer", to instruct the web browser 110 to display the elements of a 2D content in a particular portion of the page or screen. In some implementations, a web page designer may use additional HTML tag attributes to define additional formatting rules. For example, if the user has a reduced sensitivity to a specific color (e.g., red), do not display red and instead use another color, or as discussed above, if a video that had a preference to be displayed on a vertical surface cannot be displayed on a vertical surface, alternatively display the video on another (physical) surface or create a virtual surface and display the video on the virtual surface. Below is an example HTML Page parser implemented in a browser for parsing through an HTML page to extract hints/tags from each element within the HTML page.

Example HTML Page Parser Implemented in a Browser

```
vector<WorldSurface> m_world_surfaces;
vector<MLLayout> m_layouts;
struct WorldSurface {
    // world position of the planar surface (x, y, z)
    vec3 position;
    // world orientation of the planar surface (x, y, z)
    vec3 rotation;
    // width and height of the planar surface
    float width;
    float height;
    // type = vertical, horizontal, inclined, etc.
    string type;
}
void PopulateWorldSurfaceList( ) {
    QueryWorldSurfacesFromEnvironment( );
    while (is_world_scan_in_progress) {
        WorldSurface surface;
        surface.width = CalculateLatestSurfaceSize( ).width( );
        surface.height = CalculateLatestSurfaceSize( ).height( );
        surface.position = CalculateLatestSurfaceTransform( ).pos( );
        surface.rotation = CalculateLatestSurfaceTransform( ).rot( );
        float distance_to_surface =
            (Camera( ).position − surface.position).distance( );
        vec3 gravity_direction = vec3(0, −1, 0); // always down
        vec3 surface_normal = CalculateLatestSurfaceNormal( );
```

-continued

```
        // determines surface type based on the angle between surface
        // normal and gravity vector
        surface.type = DetermineLatestSurfaceType(gravity,
            surface_normal);
        m_world_surfaces.push_back(surface);
    }
}
struct MLContainer {
    float width;
    float height;
}
struct MLLayout {
    // planar, list, grid, stack, etc.
    string layout;
    // hint used for matching algorithm
    int priority;
    // hint used for matching algorithm: vertical, horizontal
    string type;
    // any extra layout specific properties: e.g distance-depth
    string[ ] properties;
    // each layout consists of 1+ layout objects
    vector<MLContainer> objects;
}
void ParseHTMLDocumet(string url) {
    WebDocument document = LoadURL(url);
    Tag[ ] tags = document.ParseTags( );
    for (int i = 0; i < tags.size( ); i++) {
        if (tags[i].name == "ml-layout") {
            MLLayout ml_layout;
            ml_layout.layout = tags[i].propertyValue("layout");
            ml_layout.priority = tags[i].propertyValue("priority");
            ml_layout.type = tags[i].propertyValue("type");
            ml_layouts.push_back(ml_layout);
            while (tags[i].children( ) != NULL) {
                if (tags[i].GetNextChild( ).name == "ml-container") {
                    MLContainer ml_container;
                    ml_container.width =
                        tags[i].propertyValue("width");
                    ml_container.height =
                        tags[i].propertyValue("height");
                    ml_layout.objects.push_back(ml_container);
                }
            }
        }
    }
}
void main( ) {
    // url is loaded already into the page from user input
    string url = GetWebPageURL( );
    ParseHTMLDocument(url);
    // world is already being scanned while a device with sensors is
    running PopulateWorldSurfaceList( );
    DoMatchLayoutsToSurfaces(ml_layouts, m_world_surfaces);
}
```

The example HTML Page parser shows how an HTML page containing HTML tags used to provide display preferences for particular elements/objects within a 2D content (e.g., web page) can be parsed and identified and/or extracted/replicated. As disclosed in the example HTML Page parser, elements within a 2D content (e.g., a web page) can be parsed using the sample code disclosed. Certain HTML tags using various element names and values may be identified/extracted by the HTML Page parser (e.g., ML.layout, ML.container, etc.) to determine how the particular element is to be displayed to a user in a 3D environment (e.g., by mapping the element to a particular surface).

Looking up/searching alternative display forms for the one or more elements is performed at 440. Certain formatting rules may be specified for an image on a web page. For example, if the web browser 110 is capable of displaying a 3D version of the image, the web page designer may place an additional tag or define certain attributes of a particular tag to allow the web browser 110 to recognize that the image may have an alternative version of the image (e.g., a 3D version of the image). The web browser 110 may then access the alternative version of the image (e.g., the 3D version of the image) to be displayed in the 3D enabled browser.

Storing the identified elements within the 2D content is performed at 450. The method may store the identified elements into a non-transitory storage medium to be used by a mapping routine (e.g., mapping the elements to the identified surfaces at 340 of FIG. 3) to map the elements to particular surfaces. The non-transitory storage medium may include a data storage device such as the storage device 130 or the local storage device 140. The elements may be stored in a particular table such as the table disclosed in FIG. 5, described below. In some implementations, the identified elements within the 2D content may be stored in a transitory storage medium.

FIG. 5 shows an example of a table to store elements deconstructed from a 2D content, according to some implementations. Elements table 500 is an example table that can store the results of the identifying elements within 2D content at 410 of FIG. 4 in a database. The elements table 500 includes, for example, information about the one or more elements within the 2D content including an element identification (ID) 510, a preference indicator 520 for where the element could be placed on a 3D surface, a parent element ID 530 if the particular element is included within a parent element, a child element ID 540 if the element may contain a child element, and a multiple entity indicator 550 to indicate whether the element contains multiple implementations that may warrant the need to have the surface or virtual object that is used to display the element be compatible with displaying multiple versions of the elements. A parent element is an element/object within the 2D content that may contain sub-elements (e.g., child elements). For example, the Element ID having a value of 220 (e.g., main video 220) has a Parent Element ID value of 260 (e.g., active tab 260), which indicates that the main video 220 is a child element of the active tab 260. Or stated in a different way, the main video 220 is included within the active tab 260. Continuing with the same example, the main video 220 has a Child Element ID 230 (e.g., user comments 230) which indicates that the user comments 230 is associated with the main video 220. One of ordinary skill in the art may appreciate the elements table 500 may be a table in a relational database or in any type of database. Additionally, the elements table 500 may be an array in a computer memory (e.g., a cache) containing the results of the identifying elements within 2D content at 410 of FIG. 4.

Each row of rows 560 in the elements table 500 corresponds to an element from within a web page. The element ID 510 is a column containing a unique identifier for each element (e.g., an element ID). In some implementations, an element's uniqueness may be defined as a combination of the element ID 510 column and another column within the table (e.g., the preference 520 column if there is more than one preference identified by the content designer). The preference 520 is a column whose value may be determined based at least in part on the HTML tags and attributes defined by the content designer/developer (e.g., a web page designer) and identified by the system and method as disclosed in extracting hints or tags from each element at 430 of FIG. 4. In other implementations, the preference 520 column may be determined based at least in part on predefined browser rules to specify where certain types of elements within a web page are to be displayed within a 3D environment. These predefined rules may provide suggestions to the systems and methods to determine where to best place the element in the 3D environment.

The parent element ID 530 is a column that contains the element ID of a parent element that this particular element in the current row is displayed within or is related to. A particular element within a web page may be embedded, placed within another element of the page, or related to another element on the page. For example, in one implementation, a first entry of the element ID 510 column stores a value of element ID 220 corresponding to the main video 220 of FIG. 2. A preference value in the preference 520 column corresponding to the main video 220 is determined based on the HTML tags and/or attributes and, in this implementation, is that this element is to be placed in the "Main" location of a user's physical environment 105. Depending on the current location of the user 108, that main location may be a wall in a living room, or a stove top hood in a kitchen that the user 108 is currently looking at, or if in a wide-open space, may be a virtual object that is projected in front of the line of site of the user 108 that the main video 220 may be projected onto. More information on how the elements of 2D content are displayed to the user 108 will be disclosed in a later section. In continuing with the current example, the parent element ID 530 column stores a value of element ID 260 corresponding to the active tab 260 of FIG. 2. Therefore, the main video 220 is a child of the active tab 260.

The child element ID 540 is a column that contains the element ID of a child element that this particular element in the current row has displayed within or is related to. A particular element within a web page may be embedded, placed within another element of the page, or related to another element on the page. In continuing with the current example, the child element ID 540 column stores a value of element ID 230 corresponding to the user comments 230 of FIG. 2.

The multiple entity indicator 550 is a column that indicates whether the element contains multiple entities that may warrant the need to have the surface or virtual object that is used to display the element be compatible with displaying multiple versions of the elements (e.g., the element may be the user comments 230, wherein for the main video 220, there may be more than one comment available). In continuing with the current example, the multiple entity indicator 550 column stores a value of "N" to indicate that the main video 220 does not have or correspond to multiple main videos in the active tab 260 (e.g., "No" multiple versions of the main video 220).

In continuing with the current example, a second entry of the element ID 510 column stores a value of element ID 230 corresponding to the user comments 230 of FIG. 2. A preference value in the preference 520 column corresponding to the user comments 230 shows a preference of "Horizontal" to indicate that the user comments 230 is to be placed on a "Horizontal" surface somewhere in the user's physical environment 105. As discussed above, the horizontal surface can be determined based on available horizontal surfaces in the user's physical environment 105. In some implementations, the user's physical environment 105 may not have a horizontal surface, in which case, the systems and methods of the current disclosure may identify/create a virtual object with a horizontal surface to display the user comments 230. In continuing with the current example, the parent element ID 530 column stores a value element ID 220 corresponding to the main video 220 of FIG. 2, and the multiple entity indicator 550 column stores a value of "Y" to indicate that user comments 230 may contain more than one value (e.g., more than one user comment).

The remaining rows within the elements table 500 contain information for the remaining elements of interest to the user 108. One of ordinary skills in the art may appreciate that storing the results of the identifying elements within the 2D content at 410 improves the functioning of the computer itself because once this analysis has been performed on the 2D content, it may be retained by the system and method for future analysis of the 2D content if another user is interested in the same 2D content. The system and method for deconstructing this particular 2D content may be avoided since it has already been completed before.

In some implementations, the element table 500 may be stored in the storage devices 130. In other implementations, the element table 500 may be stored in the local storage device 140 for quick access to recently viewed 2D content or for possible revisit to the recently viewed 2D content. Yet in other implementations, the element table 500 may be stored at both the storage devices 130 located remotely from the user 108 and the local storage device 140 located local to the user 108.

Returning to FIG. 3, the method continues with identifying surrounding surfaces at 330. The user 108 may view the user's physical environment 105 through the head-mounted system 160 to allow the head-mounted system 160 to capture and identify surrounding surfaces such as a wall, a table, a painting, a window frame, a stove, a refrigerator, a TV, etc. The head-mounted system 160 is aware of the real objects within the user's physical environment 105 because of the sensors and cameras on the head-mounted system 160 or with any other type of similar device. In some implementations, the head-mounted system 160 may match the real objects observed within the user's physical environment 105 with virtual objects stored within the storage devices 130 or the local storage device 140 to identify surfaces available with such virtual objects. Real objects are the objects identified within the user's physical environment 105. Virtual objects are objects that are not physically present within the user's physical environment, but may be displayed to the user to appear as though the virtual objects are present in the user's physical environment. For example, the head-mounted system 160 may detect an image of a table within the user's physical environment 105. The table image may be reduced to a 3D point cloud object for quick and efficient comparison and matching at the storage devices 130 or the local storage device 140. If a match of the real object and a 3D point cloud object (e.g., of a table) is detected, the system and method can identify the table as having a horizontal surface because the 3D point cloud object representing a table is defined as having a horizontal surface. A more detailed description of the identifying surrounding surfaces is disclosed below in FIG. 6.

In some implementations, the virtual objects may be extracted objects, wherein an extracted object may be a physical object identified within the user's physical environment 105, but is displayed to the user as a virtual object in the physical object's place so that additional processing and associations can be made to the extracted object that would not be able to be done on the physical object itself (e.g., to change the color of the physical object to highlight a particular feature of the physical object, etc.). Additionally, extracted objects may be virtual objects extracted from the 2D content (e.g., a web page from a browser) and displayed to the user 108. For example, a user 108 may choose an object such as a couch from a web page displayed on a 2D content/web page to be displayed within the user's physical environment 105. The system may recognize the chosen object (e.g., the couch) and display the extracted object (e.g., the couch) to the user 108 as if the extracted object (e.g., the couch) is physically present in the user's physical environment 105. Additionally, virtual objects may also include objects that have surfaces for displaying content (e.g., a transparent display screen in close proximity to the user for viewing certain content) that are not even in the physical presence of the user's physical environment 105, but from a displaying content from the 2D content perspective, may be an ideal display surface to present certain content to the user.

Figure 6:
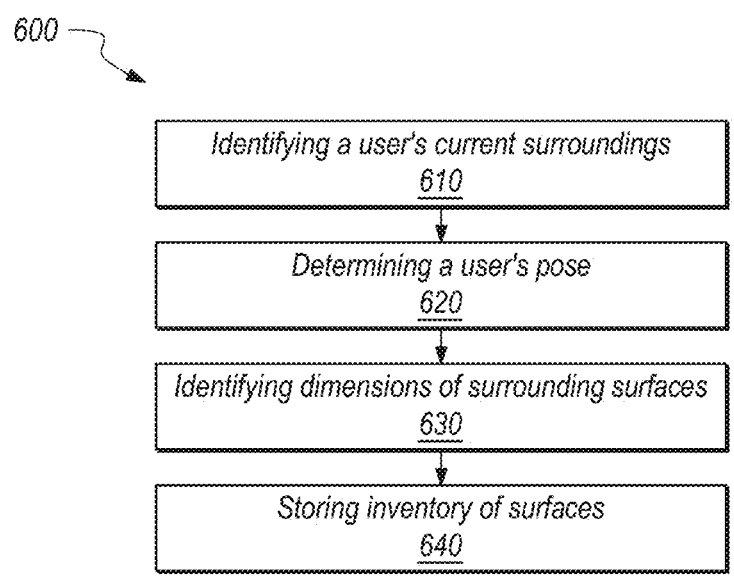
FIG. 6 is a flow diagram illustrating a method for identifying surfaces from a user's local environment, according to some implementations.

FIG. 6 is a flow diagram illustrating a method for identifying surfaces from a user's local environment, according to some implementations. FIG. 6 is a detailed flow disclosing the identifying surrounding surfaces at 330 of FIG. 3. FIG. 6 begins with identifying a user's current surroundings at 610, similar to identifying surrounding surfaces at 330 of FIG. 3. The method proceeds to the next block of determining a user's pose at 620.

Determining the user's pose at 620 is a block to identifying a user's current surrounding because the user's pose can provide perspective for the user 108 in relation to the objects within the user's physical environment 105. For example, referring back to FIG. 1, the user 108, using the head-mounted system 160, is observing the user's physical environment 105. Determining the user's pose at 620 (e.g., vector and/or origin position information relative to the world) can help the head-mounted system 160 understand, for example, (1) how tall the user 108 is in relation to the ground, (2) the angle the user 108 has to rotate their head to move about and capture the images of the room, and (3) the distance between the user 108 to the table 188, the main wall 180 and the side wall 184. Additionally, the pose of the user 108 is also helpful to determine the angle of the head-mounted system 160 when observing vertical surfaces 182 and 186, along with other surfaces within user's physical environment 105.

At 630, the method identifies dimensions of the surrounding surfaces. Each candidate surface within the user's physical environment 105 is tagged and categorized with a corresponding dimension. In some implementations, each candidate surface within the user's physical environment 105 is also tagged and categorized with a corresponding orientation. This information can be helpful to identify which element are to map to which surfaces, based at least in part on the dimension of the surface, the orientation of the surface, the distance the user 108 is away from the particular surface, and type of information that needs to be displayed for the element. For example, a video can be shown further away than a blog or an article that may contain an abundance of information where the text size of the article may be too small for a user to see if displayed on a distant wall with small dimensions.

At 640, the method stores an inventory of the surrounding surfaces into a non-transitory storage medium to be used by a mapping routine (e.g., mapping the elements to the identified surfaces 340 of FIG. 3) to map the elements to particular surfaces. The non-transitory storage medium may include a data storage device such as the storage devices 130 or the local storage device 140. The identified surfaces may be stored in a particular table such as the table disclosed in FIG. 7 described below. In some implementations, the identified surfaces may be stored in a transitory storage medium.

FIG. 7 shows an example of a table to store an inventory of surfaces identified from a user's local environment, according to some implementations. Surfaces table 700 is an example table that can store the results of the identifying surrounding surfaces process in a database. The surfaces table 700 includes, for example, information about surfaces within a user's physical environment 105 having data columns including surface ID 710, width 720, height 730, orientation 740, real or virtual indicator 750, multiple 760, and position 770. One of ordinary skill in the art may appreciate the surfaces table 700 may be a table in a relational database or in any type of database. Additionally, the surfaces table 700 may be an array in a computer memory (e.g., a cache) storing the results of the identifying surrounding surfaces at 330 of FIG. 3.

Each row of rows 780 in the surfaces table 700 may correspond to a surface from the user's physical environment 105 or a virtual surface that may be displayed to the user 108 within the user's physical environment 105. The surface ID 710 is a column containing a unique identifier to uniquely identify a particular surface (e.g., a surface ID). The dimensions of the particular surface are stored in the width 720 and height 730 columns.

The orientation 740 is a column indicating an orientation of the surface with respect to the user 108 (e.g., vertical, horizontal, etc.). The real/virtual 750 is a column indicating whether the particular surface is located on a real object within the user's physical environment 105 as perceived by the user 108 using the head-mounted system 160, or if the particular surface is located on a virtual object that can be generated by the head-mounted system 160 and displayed within the user's physical environment 105. The head-mounted system 160 may have to generate virtual objects for situations where the user's physical environment 105 may not contain enough surfaces to display an amount of content that the user 108 wishes to display. In these implementations, the head-mounted system 160 may search from a database of existing virtual objects that may have appropriate surface dimensions to display certain types of elements identified for display. The database may be from the storage devices 130 or the local storage device 140.

The multiple 760 is a column indicating whether the surface/object is compatible with displaying multiple versions of an element (e.g., the element may be the secondary tab 250 of FIG. 2, wherein for a particular web browser 110, there may be more than one secondary (e.g., inactive) tab (e.g., one web page per tab). If the multiple 760 column has a value of "Multiple", such as the case for a fourth entry of the surface ID column storing a value of 190 corresponding to the virtual Rolodex 190 of FIG. 2, and a fifth entry of the surface ID column storing a value of 194 corresponding to the multi-stack virtual object 194 of FIG. 2), the system and method can determine that if there is an element that may have multiple versions of the element, as is the case for inactive tabs, these are the types of surfaces that can accommodate the multiple versions.

The position 770 is a column indicating the position of the physical surface relative to a frame of reference or a reference point. The position of the physical surface may be pre-determined to be the center of the surface as shown in the column header of position 770 in FIG. 7. In other implementations, the position may be pre-determined to be another reference point of the surface (e.g., the front, back, top or bottom of the surface). The position information may be represented as a vector and/or positional information from the center of the physical surface relative to some frame of reference or reference point. There may be several ways to represent position in the surface table 700. For example, the value of the position for surface ID 194 in surface table 700 is represented in the abstract to illustrate vector information and frame of reference information (e.g., the 'frame' subscript). The x,y,z are 3D coordinates in each spatial dimension and frame denotes which frame of reference the 3D coordinates are with respect to.

For example, surface ID 186 shows a position of the center of the surface 186 to be (1.3, 2.3, 1.3) with respect to a real world origin. As another example, surface ID 192 shows a position of the center of the surface 192 to be (x,y,z) with respect to a user frame of reference and surface ID 190 shows a position of the center of the surface 190 to be (x,y,z) with respect to another surface 182. The frame of reference is important to disambiguate which frame of reference is currently being used. In the case of a real world origin as the frame of reference, it is generally a static frame of reference. However, in other implementations when the frame of reference is a user frame of reference, the user may be a moving reference frame, in which case, the plane (or vector information) may be moving and changing with the user if the user is moving and the user frame of reference is used as the frame of reference. In some implementations, the frame of reference for each surface may be the same (e.g., user frame of reference). In other implementations, the frame of reference for surfaces stored within a surface table 700 may be different, depending on surface (e.g., user frame of reference, world frame of reference, another surface or object in the room, etc.)

In the current example, the values stored within the surfaces table 700 contain physical surfaces (e.g., the vertical surfaces 182 and 186, and the horizontal surface 192) identified within the user's physical environment 105 of FIG. 2 and virtual surfaces (e.g., the virtual Rolodex 190 and the multi-stack virtual object 194). For example, in the current implementation, a first entry of the surface ID 710 column stores a value of surface ID 182 corresponding to the vertical surface 182 of FIG. 2. A width value in the width 720 column and a height value in the height 730 column corresponding to the width and height of the vertical surface 182, respectively, indicate the vertical surface 182 has a dimension of 48" (W) by 36" (H). Similarly, an orientation value in the orientation 740 column indicates the vertical surface 182 has an orientation of "Vertical." Additionally, a real/virtual value in the real/virtual 750 column indicates the vertical surface 182 is a "R" (e.g., real) surface. A multiple value in the multiple 760 column indicates that vertical surface 182 is "Single" (e.g., can only hold a single content). Finally, a position 770 column indicates the position of the vertical surface 182 with respect to the user 108 with a vector information of (2.5, 2.3, 1.2) user.

The remaining rows within the surfaces table 700 contain information for the remaining surfaces within the user's physical environment 105. One of ordinary skills in the art may appreciate that storing the results of the identifying surrounding surfaces at 330 of FIG. 3 improves the functioning of the computer itself because once this analysis has been performed on the surrounding surfaces, it may be retained by the head-mounted system 160 for future analysis of the user's surrounding surfaces if another user or the same user 108 is in the same physical environment 105 but interested in different 2D content. The processing blocks for identifying surrounding surfaces at 330 may be avoided since these processing blocks have already been completed before. The only differences may include identifying additional or different virtual objects to be available based at least in part on the elements table 500 identifying the elements with the different 2D content.

In some implementations, the surfaces table 700 is stored in the storage devices 130. In other implementations, the surfaces table 700 is stored in the local storage device 140 of the user 108 for quick access to recently viewed 2D content or for possible revisit to the recently viewed 2D content. Yet in other implementations, the surfaces table 700 may be stored at both the storage devices 130 located remotely from the user 108 and the local storage device 140 located local to the user 108.

Figure 8:
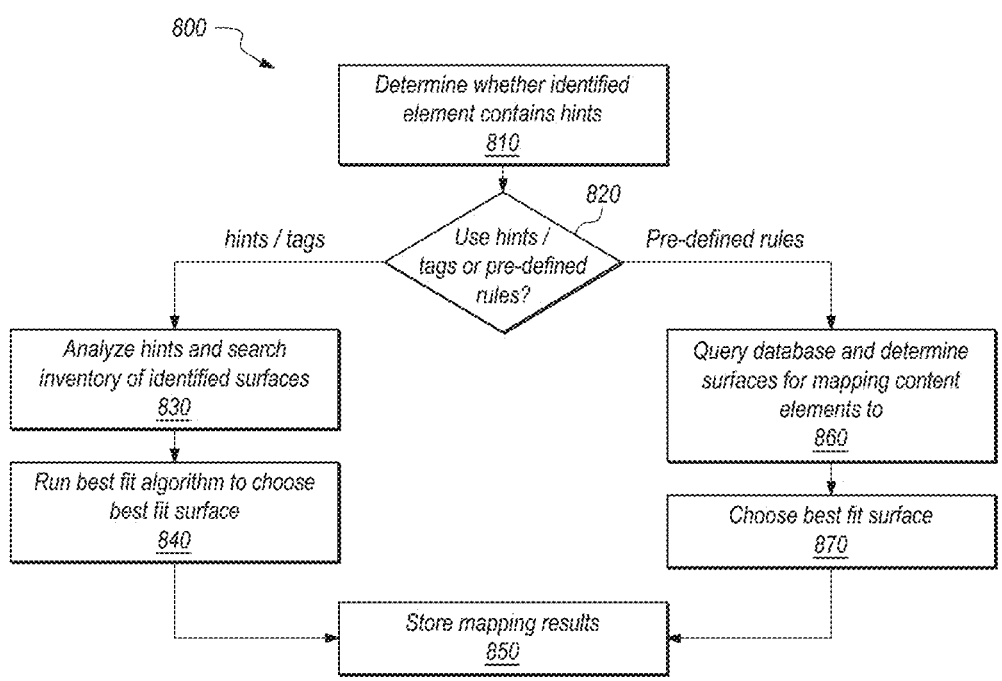
FIG. 8 is a flow diagram illustrating a method for mapping elements from a 2D content to available surfaces, according to some implementations.

Returning to FIG. 3, the method continues with mapping elements to identified surfaces at 340 using a combination of the identified elements from the identifying elements in the 2D content 320 and the identified surrounding surfaces from the identifying surrounding surfaces at 330 and in some implementations, using virtual objects as additional surfaces. Mapping the identified elements to the identified surfaces may involve multiple factors, some of which may include analyzing hints provided by a 2D content designer/author via HTML tag elements defined by the 2D content designer/author by using an HTML Page parser such as the example HTML Page parser discussed above. Other factors may include selecting from a pre-defined set of rules of how and where to map certain 2D content as provided by an AR browser, AR interface, and/or cloud storage. FIG. 8 provides a detailed flow of the mapping process of mapping one or more elements from the 2D content to identified surfaces.

FIG. 8 depicts a flow diagram illustrating a method for mapping elements from 2D content to surfaces, according to some implementations. FIG. 8 is a detailed flow disclosing the mapping elements to identified surfaces at 340 of FIG. 3.

At 810, the method determines whether an identified element contains hints provided by the 2D content designer. The 2D content designer may provide hints as to where to best display a particular element when the 2D content designer originally designed the 2D content. For example, the main video 220 of FIG. 2 may be a YOUTUBE video displayed on a web page within the active tab 260. The 2D content designer (e.g., web page designer) may provide a hint to indicate that the main video 220 is best displayed on a flat vertical surface in the direct view of the user 108. In some implementations, this may be accomplished by using existing HTML tag elements, originally designed for 2D web page content, to further define how a particular content element within the 2D content may be displayed if a 3D display environment is available. As another example, a 2D content designer may provide a hint that states that a 3D image is available instead of a 2D image for a particular web page. For example, in the case of a 2D image, the 2D content designer may, in addition to providing the basic HTML tags to identify the source of the 2D content, provide other infrequently used HTML tags to identify the source of a 3D version of the 2D image and in addition, provide a hint that if the 3D version of the image is used, to display it prominently in front of the user's view (e.g., in a main frame of a 3D layout). In some implementations, the 2D content designer may provide this additional 'hint' to a 3D image location of the 2D image just in case the web browser 110 rendering the 2D content may have 3D displaying functionalities to leverage the enhanced 3D image. One skilled in the art may appreciate there are many other ways a 2D content designer may provide hints as to where a particular content element is to be placed in a 2D layout other than what has been disclosed herein and that these are some examples of different ways a 2D content designer may provide hints to best display certain or all elements within a 2D content.

In another implementation, the HTML tag standard may include new HTML tags or the creation of a similar mark-up language for providing hints of 3D object placement in a user's surrounding for AR/VR specific types of browsers such as the Example HTML Web Page provided by the web page developer discussed above. As of this writing, these new HTML tags have not yet been created and/or adopted as standard tags within the HTML language. However, once the HTML standard includes these types of additional tags, certain implementations of the current methods and systems leverage these new tags to further provide a mapping of the identified elements to identified surfaces. One skilled in the art may appreciate there are many other languages other than HTML tags that may be modified or adopted to further provide hints for how content elements are displayed in a 3D environment and that new HTML tagging standards is just one way to achieve such a goal.

At 820, the method determines whether to use hints provided by the 2D content designer or to use pre-defined sets of rules to map the one or more content elements from the 2D content to certain types of 3D surfaces. In some implementations, where there are no hints provided by the 2D content designer for a particular content element, the system and method may determine, using the pre-defined sets of rules, the best way to map the content element to the surfaces. In other implementations, even when there may be hints for placement of the content element provided by the 2D content designer, the system and method may also determine that it may be best to use the pre-defined sets of rules to map the content elements to the surfaces. However, in other implementations, the system and method may determine that the hints provided by the 2D content designer are sufficient and thus use the hints to map the content elements to the surfaces. In the end, it is the ultimate decision of the AR browser that determines whether to use hints provided by the 2D content designer or to use pre-defined rules to map content elements to surfaces.

At 830, assuming it was determined that using the hints provided by the 2D content designer is the way to proceed, the method analyzes the hints and searches the inventory of identified surrounding surfaces that may be used to display the particular content element based at least in part on the hint (e.g., querying the surfaces table 700). At 840, the method runs a best-fit algorithm to choose a best-fit surface for the particular content element based on the provided hint. The best-fit algorithm, for example, may take a hint of "main content" for a particular content element within the particular web page and try to identify a 3D surface from among the available identified surrounding surfaces that is front and center with respect to the user 108 in the 3D environment. For example, the main video 220 of FIG. 2 is mapped to the vertical surface 182 because the main video 220 has a preference value of "Main" in the preference 520 column of the elements table 500 of FIG. 5 within the active tab 260 and the vertical surface 182 is the surface that is in the direct vision of the user 108 and has an optimal sized dimension to display a main video 220.

At 850, the method stores the mapping results for the content elements in a mapping of elements to surfaces table in a non-transitory storage medium to be used by a display algorithm to display the content elements onto their respectively mapped surfaces, whether the surfaces are the identified surrounding surfaces or virtual objects displayed in the user's surrounding environment. The non-transitory storage medium may include a data storage device such as the storage devices 130 or the local storage device 140. The mapping results may be stored in a particular table such as the table disclosed in FIG. 9, described below.

FIG. 9 shows an example of a table to store the mapping of content elements from a 2D content to surfaces, according to some implementations. Mapping table 900 is an example table that stores results of the content elements mapped to surfaces process into a database. The mapping table 900 includes, for example, information about the content element (e.g., element ID) and the surface that the content element is mapped to (e.g., surface ID). One of ordinary skill in the art may appreciate the mapping table 900 may be a table stored in a relational database or in any type of database or storage medium. Additionally, the mapping table 900 may be an array in a computer memory (e.g., a cache) containing the results of the mapping of elements to identified surrounding surfaces at 340 of FIG. 3.

Each row of the mapping table 900 corresponds to a content element from the 2D content mapped to a surface either in the user's physical environment 105 or a virtual object that is displayed to the user 108, wherein the virtual object appears to be an object in the user's physical environment 105. For example, in the current implementation, a first entry of the element ID column stores a value of element ID 220 corresponding to the main video 220. A surface ID value in the surface ID column corresponding to the main video 220 is 182 corresponding to the vertical surface 182. In this manner, the main video 220 is mapped to the vertical surface 182 Similarly, the user comments 230 are mapped to the horizontal surface 192, the suggested videos 240 are mapped to the vertical surface 186, and the secondary tab 250 is mapped to the virtual Rolodex 190. The element IDs in the mapping table 900 may be associated to element IDs stored in the elements table 500 of FIG. 5. The surface IDs in the mapping table 900 may be associated to surface IDs stored in the surfaces table 700 of FIG. 7.

Returning to FIG. 8, at 860, assuming it was determined that using the predefined rules is the way to proceed, the method queries a database containing mapping rules of content elements to surfaces and determines for a particular content element within a web page, which types of surfaces are to be considered for mapping the content element. For example, the rules returned for the main video 220 from FIG. 2 may indicate that main video 220 are to be mapped to vertical surfaces, and thus after searching the surfaces table 700, multiple candidate surfaces are revealed (e.g., the vertical surfaces 182 and 186, and the virtual Rolodex 190). At 870, the pre-defined sets of rules may run a best-fit algorithm to choose from the available candidate surfaces, which surface is the best fit for this main video 220. Based at least in part on the best-fit algorithm, it is determined that the main video 220 are to be mapped to the vertical surface 182 because of all of the candidate surfaces, the vertical surface 182 is a surface that is in the direct line of sight of the user 108 and the vertical surface 182 has the best dimension for displaying a video. Once the mapping of the one or more elements is determined, at 850 the method stores the mapping results for the content elements in a mapping of elements to surfaces table in a non-transitory storage medium as described above.

Returning to FIG. 3, the method continues with displaying the one or more elements as virtual content onto mapped surfaces at 350. The head-mounted system 160 may include one or more display devices within the head-mounted system 160 such as mini projectors (not shown) to display information. The one or more elements are displayed onto the respective mapped surfaces as mapped at 340. Using the head-mounted system 160, the user 108 can see the content on the respective mapped surfaces. One of ordinarily skill in the art may appreciate the content elements are displayed to appear to be physically attached on the various surfaces (physical or virtual) but in actuality, the content elements are actually projected onto the physical surfaces as perceived by the user 108 and in the cases of virtual objects, the virtual objects are displayed to appear to be attached on the respective surfaces of the virtual objects. One of ordinarily skill in the art may appreciate that when the user 108 turns their head or looks up or down, the display devices within the head-mounted system 160 may continue to keep the content elements affixed to their respective surfaces to further provide the perception to the user 108 that the content are affixed to the mapped surfaces. In other implementations, the user 108 may change the content of the user's physical environment 105 by a motion made by head, hands, eyes or voice of the user 108.

Improved Browser/Application Implementations

In mixed reality systems, a user's workspace is not limited by the size of a display screen. Therefore, unlike conventional browsers, the browser window in a mixed reality system can be placed and retained anywhere within the user's environment. The problem is that conventional browser technologies are configured with the assumption that a displayable browser location must be limited to the confines of a display screen.

The following portion of the disclosure is directed to an improved approach to view windows in a mixed reality environment. Using mixed reality equipment, it is possible that a user may have multiple browser windows that are associated with and placed in the user's physical space. For example, the user may open a first browser window in a first room and a second browser window while in a second room. The issue addressed by this portion of the disclosure pertains to the situation where a browser window is opened in a manner such that it is anchored to a position in a first location, such that the browser window is no longer visible when the user goes to a second location. The problem is that, as a user changes environments (such as moving between rooms or going to a different geographical location), the user may nonetheless still need access to his/her previous sessions in a prior geographical location.

Figure 10:
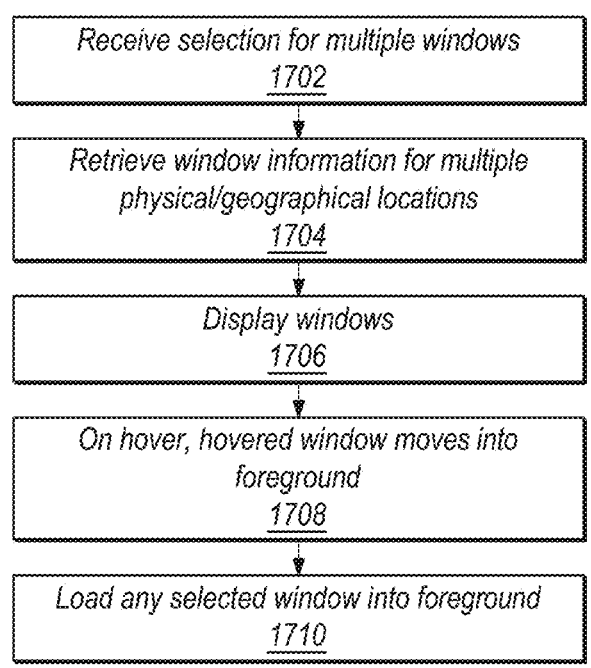
FIG. 10 illustrates a flowchart of an approach to implement viewing of a user's windows.

FIG. 10 illustrates a flowchart of an approach to implement viewing of a user's windows, regardless of the current location for the user relative to the location(s) of one or more previously-opened windows. In some implementations, a control interface is provided to select for display of all and/or multiple windows associated with the user. In some implementations, the control interface may be a user interface, such that the user may interact with the MR display system, for example by providing a user input to the system and the system responding by executing a corresponding command. In some implementations, the user may interact with visual, audio, tactile, or other aspects of the MR system. In some implementations, the user interface may comprise a browser hub, which in some implementations may be a visual representation of one or more aspects of one or more browser application(s). For example, an "All Windows" icon can be presented within the browser hub, where selection of the "All Windows" icon initiates display of the multiple windows associated with the user, regardless of the location of the user relative to the current window locations (e.g. where the windows were opened). FIG. 10 starts at block 1702, when the system receives a command to display all or multiple windows. In some implementations, block 1702 may occur when the user selects an all windows icon, which may be within a browser hub user interface. In some implementations, the system receives a selection for more than one window. In some implementations, the system may receive a user input indicating the user would like to view more than one window associated with the user's system.

At 1704, information is retrieved for the multiple windows that are associated with the user. In some implementations, the user may have one or more windows associated with the user. The windows for which information is gathered may be located in disparate physical locations. In accordance with some implementations, instead of managing browser windows in a VR/AR environment on a one-on-one basis independently by each application, the window may be instead rendered into a bounded volume hereinafter may be referred to as a "Prism." Each Prism may have characteristics and properties that allow a Universe application to manage and display the Prism in the VR/AR environment such that a Universe application may manage the placement and display of the virtual content in the VR/AR environment by managing the Prism itself. Further details regarding an approach to implement prisms is described in U.S. Patent Publication No. 2019/0197785, entitled "METHODS AND SYSTEM FOR MANAGING AND DISPLAYING VIRTUAL CONTENT IN A MIXED REALITY SYSTEM", published on Jun. 27, 2019, which is hereby incorporated by reference herein in its entirety. The information about the windows may be gathered by accessing the database of prisms that are associated with the user, where prisms may be displaying one or more windows at specified locations. Additional details for displaying, managing, or navigating virtual content in a mixed reality environment is described in U.S. Patent Publication No. 2018/0315248, entitled "MATCHING CONTENT TO A SPATIAL 3D ENVIRONMENT", published on Nov. 1, 2018, which is hereby incorporated by reference herein in its entirety.

Figure 12:
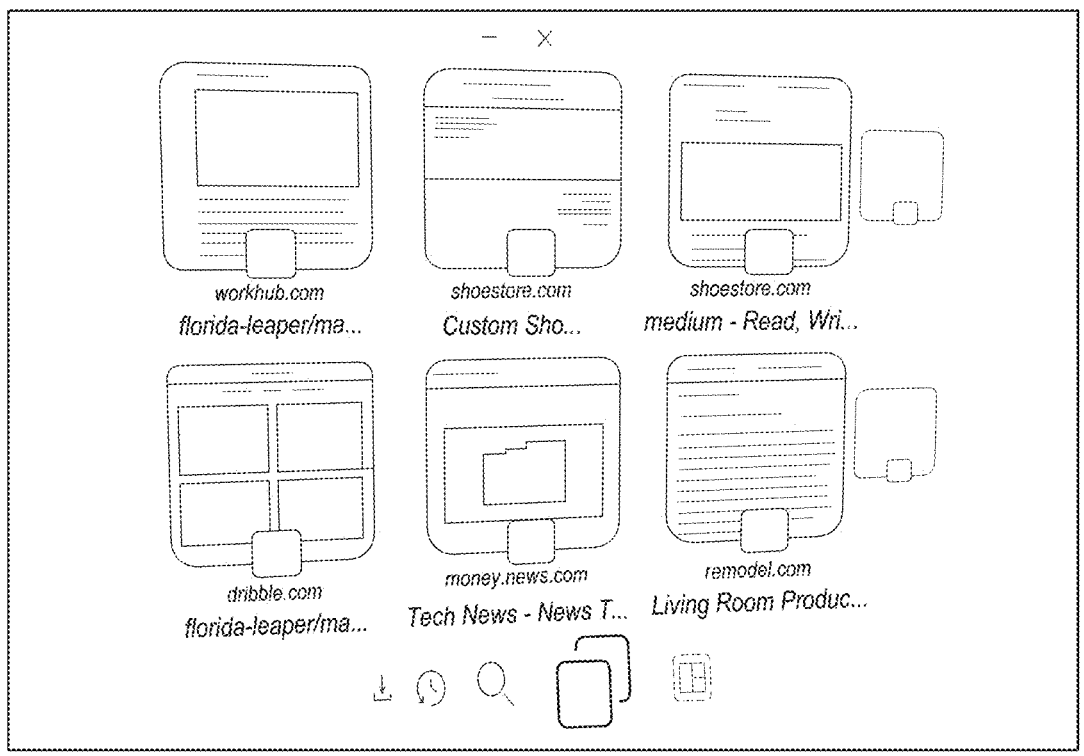
FIGS. 12-13 provide illustrations of possible approaches to display the multiple windows within a mixed realty interface.
Figure 13:
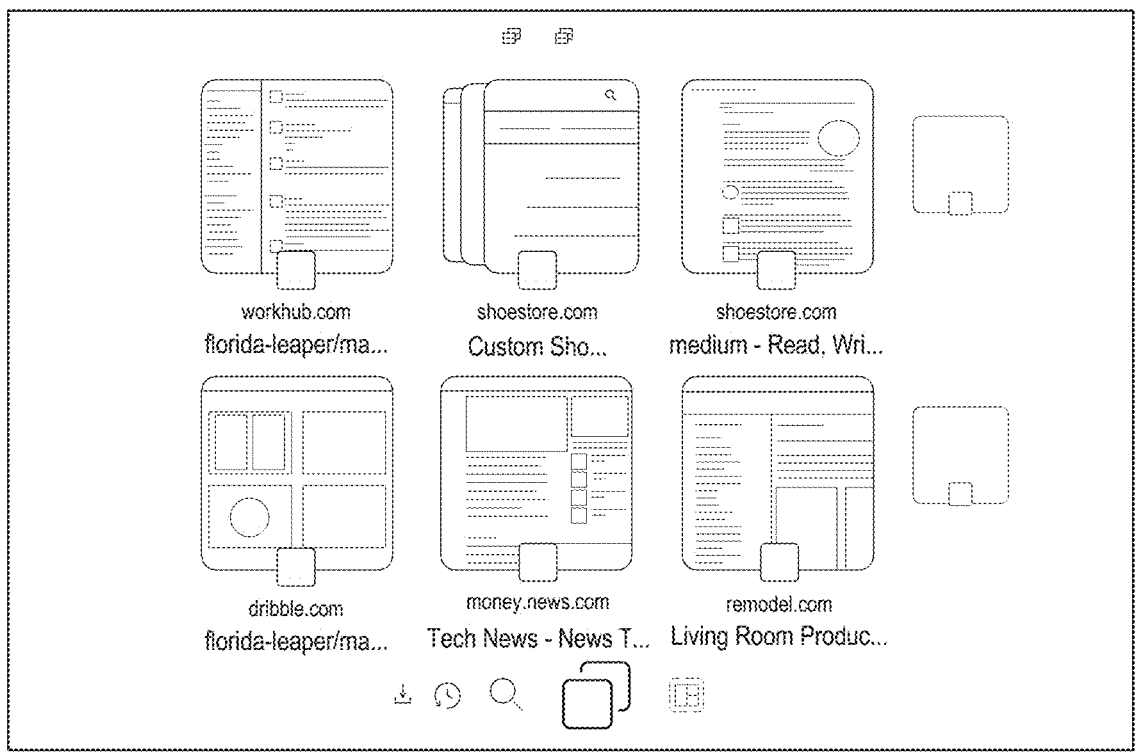
Figure 14:
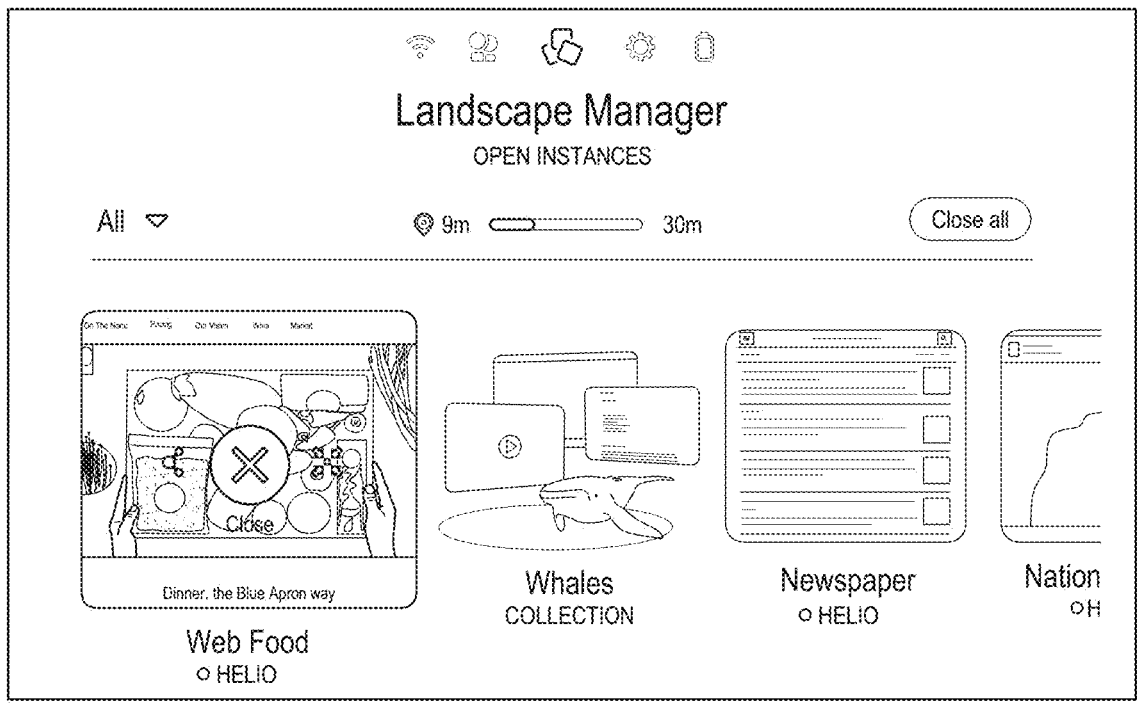
FIG. 14 illustrates a possible approach to displaying multiple prisms within a mixed reality system.

In some implementations, an "All Windows" view is loaded, showing all open windows and tabbed windows, each represented by a preview, favicon, domain name and/or page title, or any other suitable visual representation of the window (1706). In some implementations, an example of an open window includes a window actively being interacted with by one or more users. Other examples include a placed application/window/browser, whether it has an open/active status, paused status, stopped status, closed status, etc. In addition, so long as an instance of the application exists/is placed and has one or more tabs with content, then in some implementations it can be accessed remotely using the current inventive approaches. As an additional example, an open window may correspond to some or all prisms associated with a given application (e.g., browser) regardless of its status (active, paused, closed, etc.), which can be accessed remotely through the "All Windows" view in the current implementation. In some implementations, the "All Windows" view may comprise all browser windows that are contained within one or more prisms at one or more physical location in the real world. Examples of "All Windows" and an analogous "All Applications" views are shown in FIGS. 12-14 and described below. Although "All Windows" is used as an example, any other single application could be used instead. Although "All Applications" is used as an example, any subset of all the applications may be used instead.

The various windows that were identified in block 1704 can be displayed in this manner in the user's current location. This may be accomplished by changing the location parameters for the identified windows to locations within the user's current physical environment, in effect summoning the window to the user. In some implementations, this may be accomplished by creating a copy of the window information and instead associating a new location with the information, for example a location at or near the user's current location. The windows are then rendered (in preview form, thumbnail form, and/or full form) and displayed to the user at the coordinates that are assigned to the respective windows and/or the window's prism.

At 1708, which is optional in this method, a hover state may be identified and be acted upon with respect to one or more windows. For example, on hover, the window being hovered upon may move into the foreground, and the other windows may optionally recede slightly. Windows with multiple tabs may expand slightly to show the background tabs. In some implementations, instead of a window, the hovered upon object may be any visual representation of the browser window, such as a preview, full screen, or shrunken screen. At 1710, the user selects one or more of the windows. In some implementations, the user may select the window(s) by clicking a button on a controller (e.g. totem), or by performing a specific gesture, or by looking at the window for a predetermined period of time. If the user selects the window, a duplicate of the original window is loaded in the foreground of the user's FOV and the All Windows view closes. In some implementations, the duplicate either updates the original, the duplicate updates all or some additional copies, and/or the duplicate is independent from the original, depending on user selected preference. In some implementations, the content loaded in the foreground corresponds to an existing prism that is moved (e.g., unpinned and moved in its entirety). In some implementations, the content loaded in the foreground corresponds to an existing prism that is duplicated, with new associated location information. If the user activates the context menu, the user may be presented with a user menu comprising options for closing the window, adding it to a collection, and/or minimizing the window. The context menu may be a user interface with predetermined user interface options that tell the system to execute specific functions when selected. In some implementations, the context menu may be activated by a force press to the center of a touchpad on a totem while hovering over a selectable object, such as a window. In some implementations, the context window may be analogous to a right click on a desktop computer, in that the action enables the user to perform an action on the selected object, such as move, close, etc.

Figure 11A:
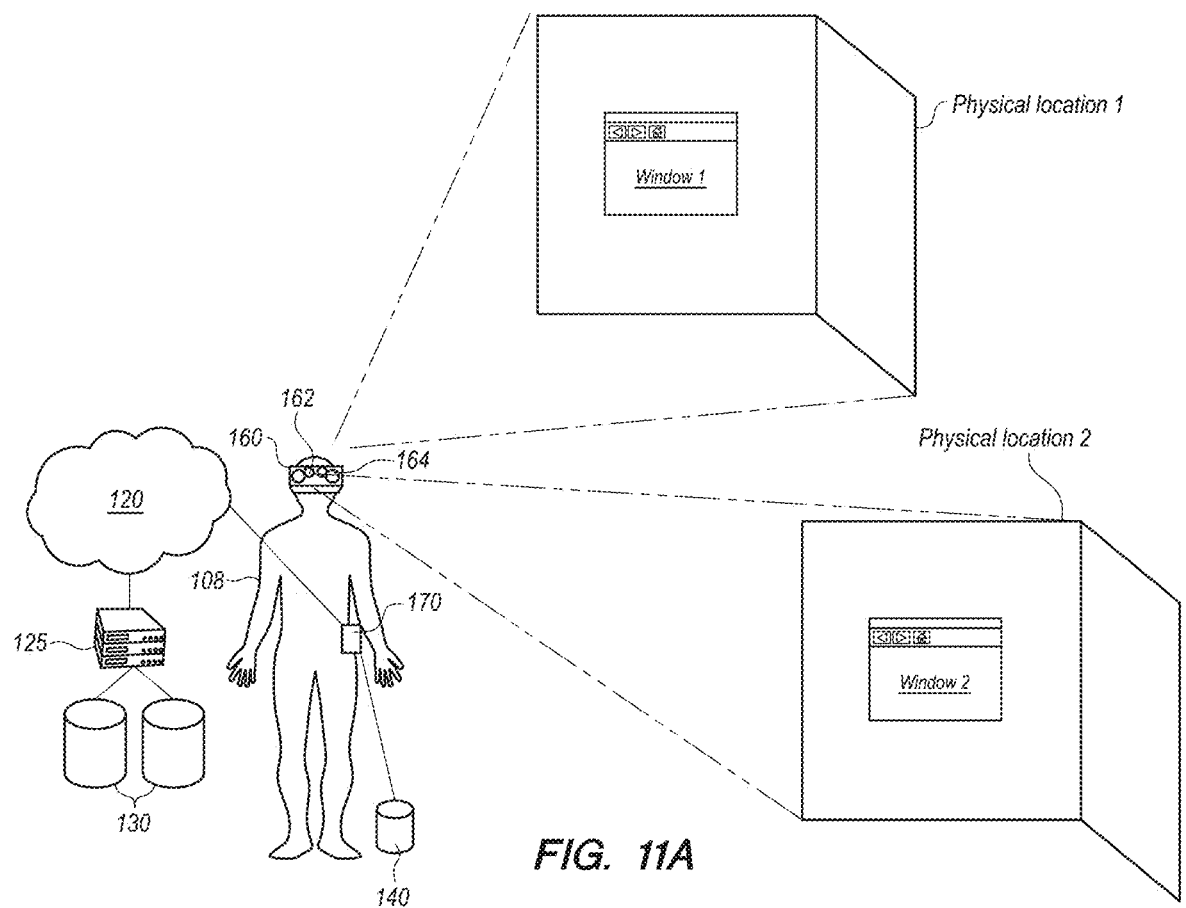
FIGS. 11A-11B illustrate a process to display windows for the user regardless of the previously physical location of the windows.
Figure 11B:
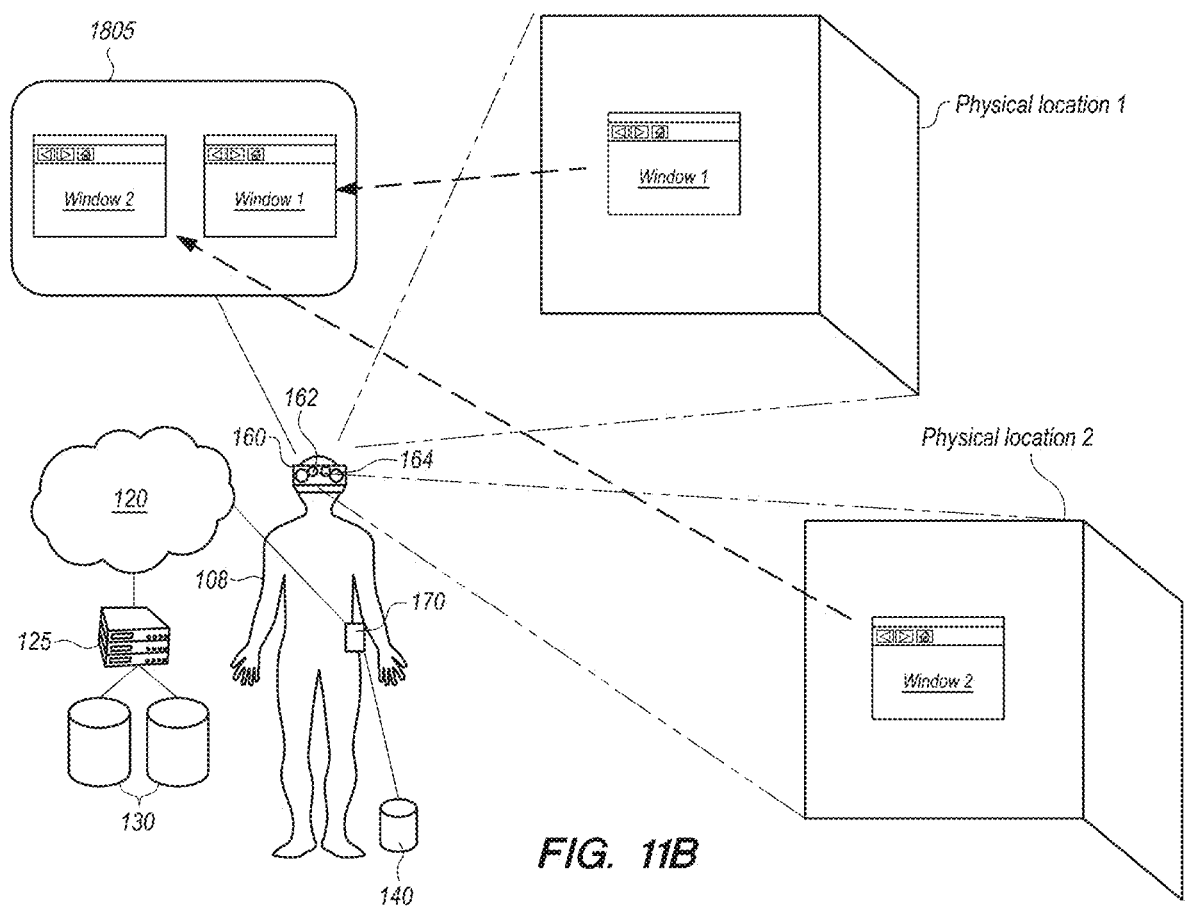

FIGS. 11A-11B illustrate this process to display windows for the user regardless of the previous physical location of the windows. In the mixed reality implementation, windows may be associated with a device and/or with a physical space. Users can place content throughout their home, or at different geographical locations throughout the day. In FIG. 11A, it can be seen that a first browser window 1 has been placed into a first physical location, while a second browser window 2 has been placed into a second physical location. Since the windows are associated with specific physical locations/coordinate space in a mixed reality implementation, this means that window 1 would normally only be visible when the user 108 is located in physical location 1, but not visible when the user 108 is located in physical location 2. Similarly, window 2 would normally only be visible when the user 108 is located in physical location 2, but not visible when the user 108 is located in physical location 1.

As shown in FIG. 11B, an "All Windows" view 1805 allows the user 108 to view, re-open, and close open windows, regardless of physical location (see earlier paragraphs for examples of "open" windows). Therefore, view 1805 can display a manipulatable version (e.g. visual representation) of both window 1 and window 2, despite the fact that these windows were associated with different physical locations. When accessed from the browser's control hub, View All Windows (or alternatively "All Windows") allows users to see all open windows, regardless of their physical or geographical position. The windows may be in the same room, a different room, or another space entirely. A screenshot, favicon, domain, and/or page title are used to identify (e.g. visually represent) each window. In some implementations, windows with multiple tabs show stacked previews of the underlying tabs on hover. With the context menu, users can open new instances of a window, close windows, minimize windows, bookmark windows, and add windows to collection—regardless of location. Global buttons may also be provided that can be used to close or minimize all open windows.

FIGS. 12-13 provide illustrations of possible approaches to display the multiple windows within a mixed realty interface. These figures illustrate example approach(es) to implement an interface where multiple windows are displayed and presented to a user. Any of the browser windows can be selected by a suitable user input device, such as a pointing device, for further viewing by the user. To the extent there are too many windows than can fit onto the interface, in some implementations, additional windows can be visually "ghosted" (as shown on the right-hand side of FIG. 12 and FIG. 13), with scrolling controls provided to scroll to the additional windows.

Therefore, what has been described is an improved approach to view windows in a mixed reality environment, where a view is provided of a user's windows, regardless of the current location for the user relative to one or more previously-opened windows. This addresses and resolves the situation where, when using mixed reality equipment, a user may want to access one or more browser windows that are associated with one or more different physical locations.

While the implementations above have been described in terms of a browser application, the scope of the claims also cover any other application or set of applications. In some implementations, all applications in an operating system can be selected and displayed according to the claims. Such implementations would have applications in prisms instead of parsed browser content in windows.

Such an implementation is depicted in FIG. 14, which displays a plurality of applications in a plurality of prisms. The "All" button is an example drop down filter to help sort through the application options for display and selection (e.g., by category). The example slider bar that ranges from 9 m to 30 m selects applications that are included in the all applications/landscape manager display based on a distance from the user, although other suitable selection or filtering methods and/or interfaces may be used. In some implementations, the user can set the slider bar to a smaller distance corresponding to a room to display all applications available in that room. In some implementations, the user can set the slider bar to a larger distance corresponding to a house to display all applications available in the whole house. In some implementations, the slider bar can be set with the far right corresponding to all apps regardless of location. The "Close all" button is an example user interface element for controlling and/or manipulating applications. Other user interface elements may open all, move, etc., as described above. FIG. 14 depicts two different instances of the "HELIO" application and a "COLLECTION" application among the open applications. Accordingly, the "All" button can display multiple instances of an application as well as different applications. The various mixed reality web browsing techniques and applications described herein are sometimes referred to as a Helio technique or application, and a mixed reality web browser may sometimes be referred to as a Helio browser.

System Architecture Overview

Figure 15:
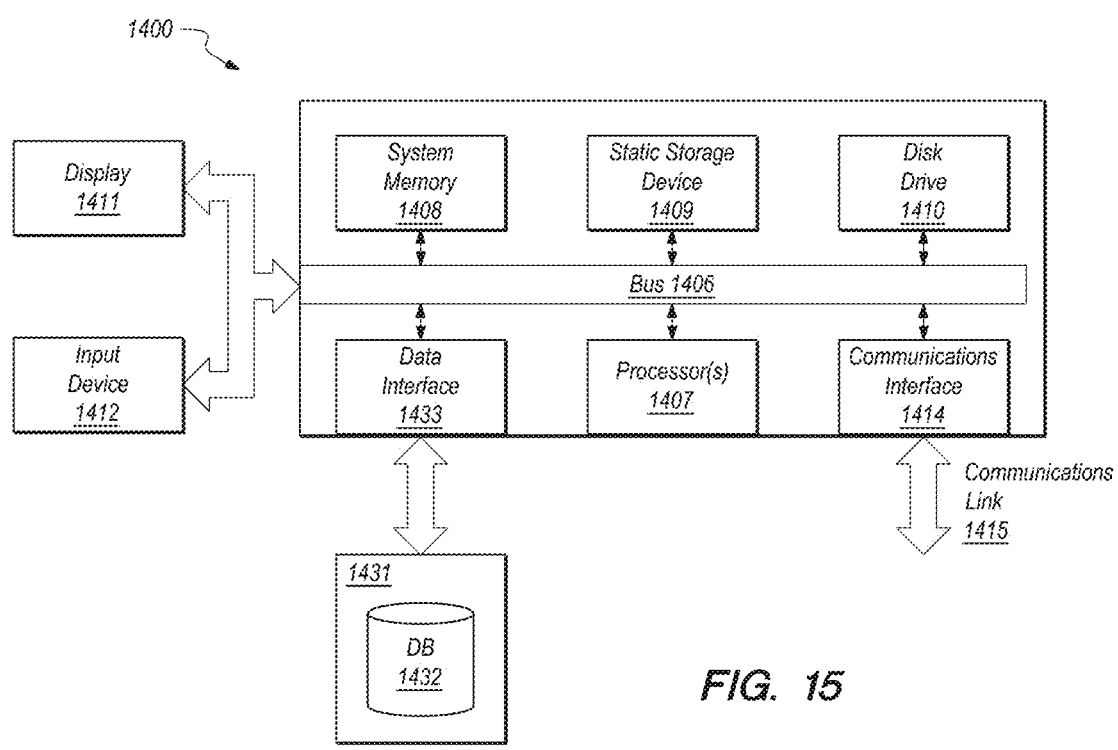
FIG. 15 is a block diagram of an illustrative computing system suitable for implementing an implementation of the present disclosure.

FIG. 15 is a block diagram of an illustrative computing system 1400 suitable for implementing an implementation of the present disclosure. The computing system 1400 includes a bus 1406 or other communication mechanism for communicating information, which interconnects subsystems and devices, such as a processor 1407, system memory 1408 (e.g., RAM), a static storage device 1409 (e.g., ROM), a disk drive 1410 (e.g., magnetic or optical), a communications interface 1414 (e.g., modem or Ethernet card), a display 1411 (e.g., a display of the head mounted system 160, which projects virtual content to the eye(s) of the user), an input device 1412 (e.g., keyboard and mouse, hand-held totem, etc.). The processor 170 associated with the head mounted system 160 can comprise the processor 1407. The processor 170 or the processor 1407 can implement the functionality described herein.

According to one implementation, the computing system 1400 performs specific operations by the processor 1407 executing one or more sequences of one or more instructions contained in the system memory 1408. Such instructions may be read into the system memory 1408 from another computer readable/usable medium, such as the static storage device 1409 or the disk drive 1410. In alternative implementations, hard-wired circuitry may be used in place of or in combination with software instructions to implement the functionality described in this disclosure. Thus, implementations of the disclosure are not limited to any specific combination of hardware circuitry and/or software. In one implementation, the term "logic" shall mean any combination of software or hardware that is used to implement all or part of the disclosure.

The term "computer readable medium" or "computer usable medium" as used herein refers to any medium that participates in providing instructions to the processor 1407 for execution. Such a medium may take many forms, including but not limited to, non-volatile media and volatile media. Non-volatile media includes, for example, optical or magnetic disks, such as the disk drive 1410. Volatile media includes dynamic memory, such as the system memory 1408.

Common forms of computer readable media include, for example, floppy disk, flexible disk, hard disk, magnetic tape, any other magnetic medium, CD-ROM, any other optical medium, RAM, PROM, EPROM, FLASH-EPROM, any other memory chip or cartridge, or any other medium from which a computer can read.

In an implementation of the disclosure, execution of the sequences of instructions to practice the disclosure is performed by a single computing system 1400. According to other implementations of the disclosure, two or more computing systems 1400 coupled by a communications link 1415 (e.g., LAN, PTSN, or wireless network) may perform the sequence of instructions to practice the disclosure in coordination with one another.

The computing system 1400 may transmit and receive messages, data, and instructions, including program (e.g., application code) through the communications link 1415 and the communications interface 1414. Received program code may be executed by the processor 1407 as it is received, and/or stored in the disk drive 1410, or other non-volatile storage for later execution. The computing system 1400 may communicate through a data interface 1433 to a database 1432 on an external storage device 1431.

Secure Authorization in Mixed Reality

A user of a mixed reality display system (e.g., the head mounted system 160 described with reference to FIG. 1) may interact with one or more applications that are being executed by the mixed reality system. An immersive application may refer to a single application in which substantially all virtual content displayed by the mixed reality system is generated by the immersive application so that the user feels as if he or she were immersed in the application. An example of an immersive application is a game in which the user experiences a game environment that he or she interacts within. A landscape application may refer to an application that may be executed with other (e.g. one or more) applications so that the user can view virtual content associated with some or all of the landscape applications. For example, with reference to FIG. 14, a user may interact with one or more instances of a web browser (e.g., Helio), an application collection (e.g., Whales as shown in FIG. 14), an audiovisual media player application, a social media application, and so forth. Virtual content associated with each of the landscape application(s) may be presented as if appearing at different distances from the user. The user thus may have multiple landscape application(s) open, visible, and simultaneously interactable.

When the user is interacting with either immersive or landscape mixed reality application(s), the application may provide functionality that requires user authorization before the functionality can be accessed. For example, in an immersive game environment, the game application may provide functionality that permits the user to purchase upgrades to a virtual character (e.g., new clothes, new game powers, etc.). Similarly, an ecommerce application may permit the user to purchase merchandise. As another example, a social media application may permit the user to search for and find social media contacts (e.g., friends). In each of these situations, the application may require the user to authorize access to another service or authenticate his or her credentials prior to accessing the functionality. For example, prior to making purchases, a game or ecommerce application may require authentication of the user and selection of a payment method (e.g., a valid credit card or payment account) in order to deter fraud. As another example, prior to permitting searches, a social media application may require the user to securely log into the user's social media account in order to search the user's social network to preserve confidentiality.

Implementations of systems and methods will be described that permit a mixed reality user to securely interact with mixed reality applications (e.g., landscape or immersive) by providing functionality to authorize or authenticate a user (the terms authorize or authenticate are used interchangeably herein unless the context clearly indicates otherwise). The authorization protocol, which is sometimes referred to herein as "OAuth", may be an open standard that permits applications or services to authorize access to the application's assets and may not share any of the user's login information, which enhances security of the authorization process.

In some cases, the application is developed by a third-party developer rather than by the developer of the mixed reality system. Implementations of an application programming interface (API) may be provided to enable developers of the application to access the authorization functionality, for example, directly from the third-party application. Such an API may advantageously make secure authorization readily available to developers (who can call the API to open appropriate windows or display appropriate virtual content) and may also make such authorization procedures relatively similar among all applications, which makes it easier for the user to carry out the authorization procedure. For example, the API may be used to call an OAuth browser window that provides the authorization functionality (e.g., ability to securely log into a site or to authenticate payment credentials). The OAuth browser window may permit only a limited set of functionality (e.g., secure authorization) and may disable interaction with other application(s) that are being executed by the mixed reality system while the authorization process is going on. Once the authorization is completed, the user can be directed back to the application. Accordingly, implementations of the OAuth service permit seamless integration of authorization into the application flow. Examples of the behavior of implementations of the OAuth browser window will be described below. Such examples are intended to be illustrative and not limiting. In other implementations, the web browser window, the user interface, the buttons and data entry boxes can be configured differently than shown.

Figure 16A:
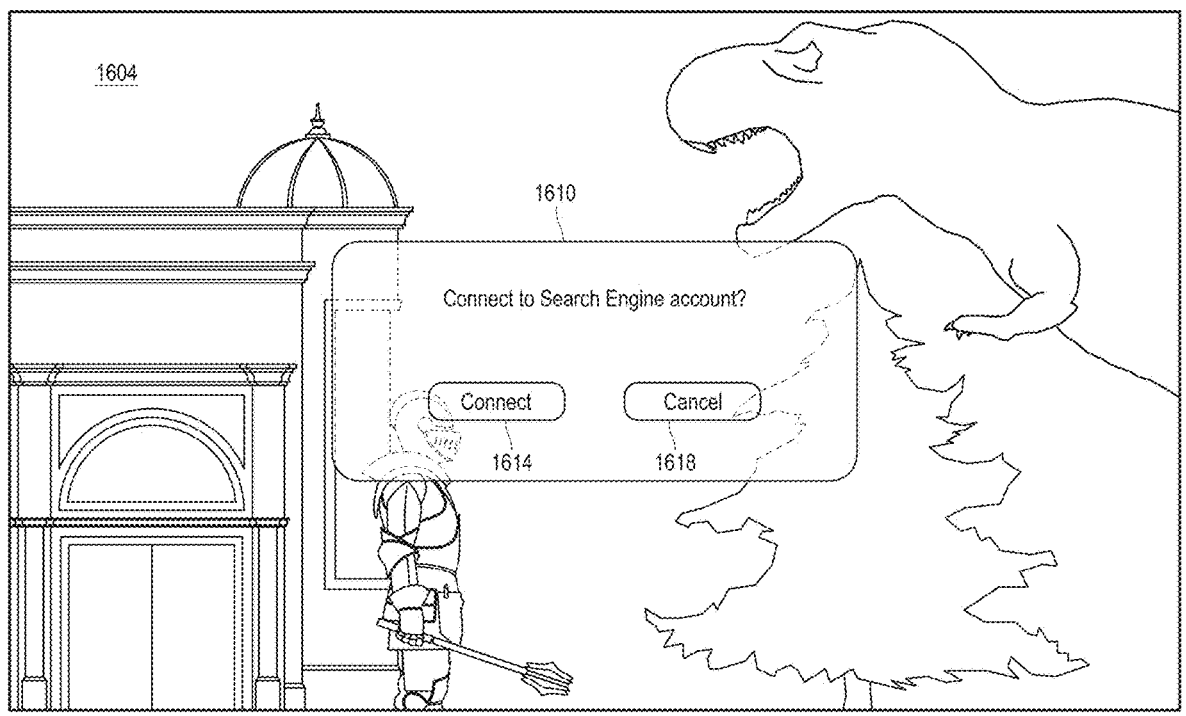
FIGS. 16A-16F illustrate various approaches to displaying authorization windows within a mixed reality environment.

FIGS. 16A-16F illustrate various approaches to displaying authorization windows within a mixed reality environment. In these figures, the application is an immersive application such as an immersive game that displays immersive game content 1604 to the user. The game application may provide functionality to permit the user to search for friends that are currently online and playing the game so that the user can play the game with them. During the game, the application may request access to another service, for example, a search engine (referred to as SearchEngine) in order to access the user's email, contacts, or other services provided by the search engine. The application may request the OAuth service from anywhere within the app. The game application can request the OAuth service (e.g., via an API call) and a window 1610 may be displayed to the user to provide consent by the game to access the search engine service. The window 1610 may be opaque (e.g., substantially blocking content behind it) or may have some amount of transparency. For example, the window 1610 shown in FIG. 16A is partially transparent so that virtual content behind the window 1610 is partially visible (shown using dashed lines). The user can select button 1614 to connect to the search engine or select button 1618 to cancel the application's attempt to connect to the search engine. As described herein to select a button, the user can click a button on a controller (e.g., a totem), perform a specific gesture, or look at the button for a threshold period of time.

Figure 16B:
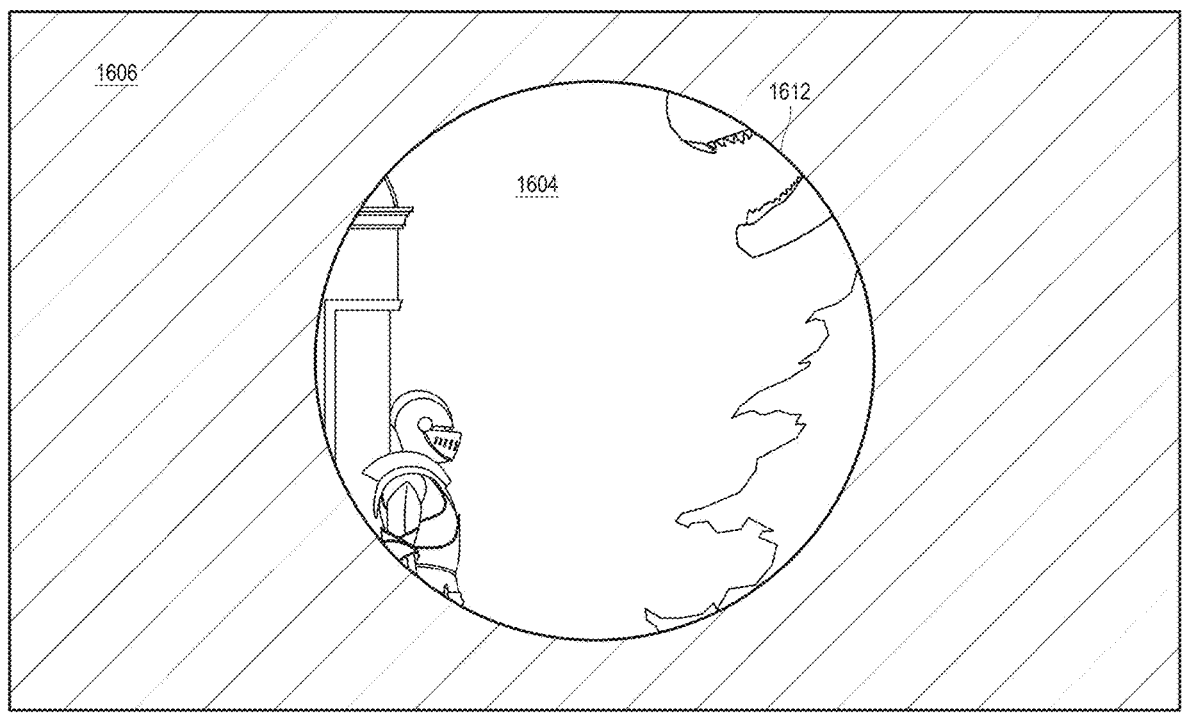

If the user accepts the connection, the OAuth protocol may then transition the display of virtual content from the immersive game content 1604 to an OAuth window (described below with reference to FIG. 16C). Any sort of visual effect transition may be used, for example a dissolve, a fade, a wipe, a cut, etc. An example of a moment in a transition is shown in FIG. 16B, where virtual game content 1604 inside a shrinking circle is displayed whereas the virtual content 1606 outside the shrinking circle 1612 may be a monochrome background. After the radius of the shrinking circle has become sufficiently small, the game content 1604 is no longer perceptible, and the circle may then increase in size to display OAuth virtual content (see FIG. 16C).

Figure 16C:
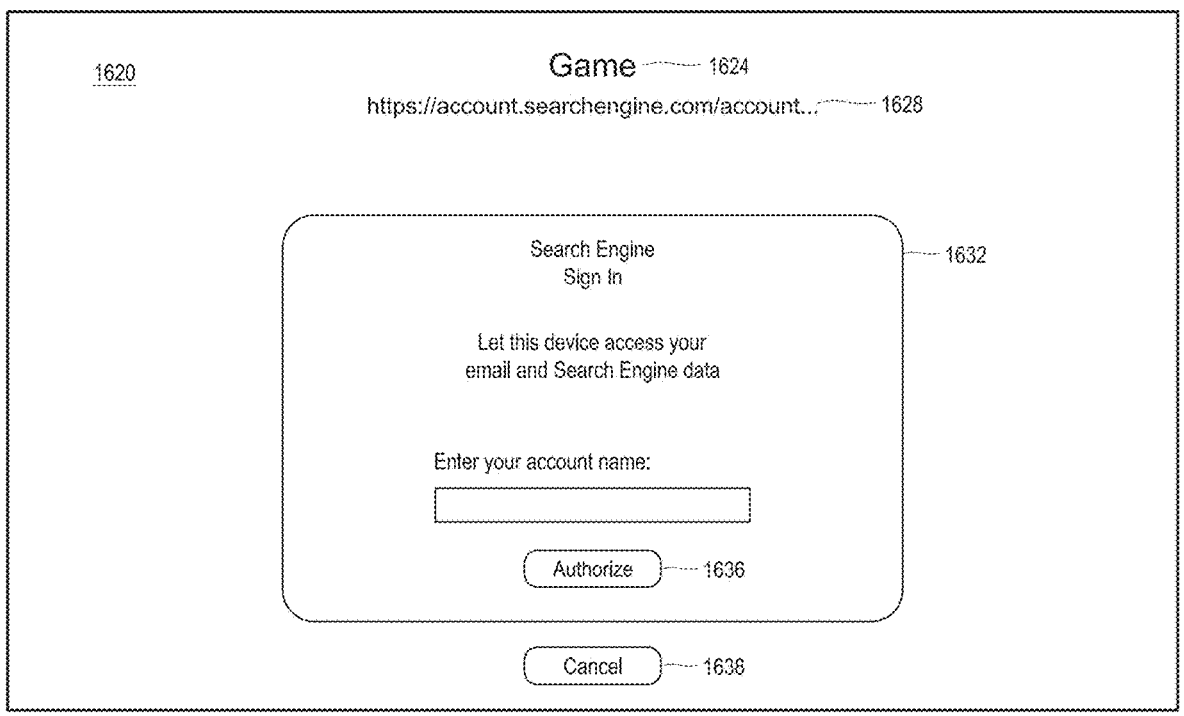

FIG. 16C shows an example of an immersive OAuth authorization window 1620. The window 1620 displays the name 1624 of the application that is requesting user authorization (in this case, the immersive "Game" application) and the web address 1628 of the service (in this case, the search engine) so that the user can check that the web server he or she is being directed to is a trusted service and not a phishing or spam service. The web address 1628 can be a uniform resource locator (URL). In this example, only a single line of the URL is shown "https://account.search-engine.com/account . . . ". In some cases, the URL may be more than a single line long, and a user may select the region of the window 1620 showing the web address 1628 to display the full URL for the link. If displaying the URL requires more than a threshold number of lines (e.g., more than 6, 8, 10, or more lines) or more than a threshold fraction of the window size (e.g., more than ¼, ⅓, ½, ⅔, or more of the window), the URL may be shown along with a scrollbar that permits the user to scroll the content to view all of the URL. In some implementations, the user can hide the full URL by tapping a button on a controller (e.g., a home button on a totem) or by selecting any area of the window 1620 outside of the region displaying the URL.

The user continues the authorization through the OAuth flow by using an authorization window 1632 associated with the service. In this example, the window 1632 is a Search-Engine.com sign-in window in which the user can enter his or her account name and authorize access (e.g., by selecting an authorize button 1636). The sign-in window shown in FIG. 16C is intended to be illustrative of the types of authentication or authorization windows provided by online services and is not intended to be limiting. In other examples, the window 1632 may be a window to create an account, to enter a password (e.g., if the user is already signed into the service), to provide payment information, and so forth. The OAuth protocol can accept any authentication or authorization flow provided by third-party services. If the user chooses not to continue with the authorization protocol, the user can select button 1638 to cancel the authorization process and to return to the application (in this case, the immersive Game).

Figure 16D:
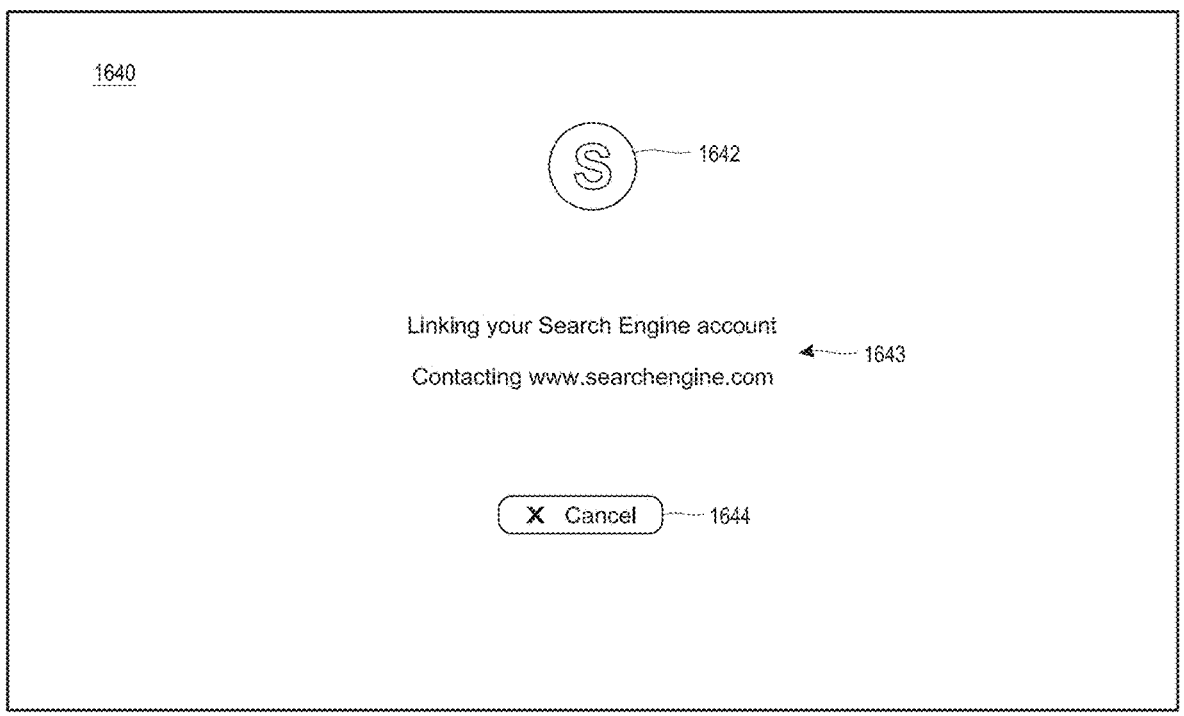
Figure 16E:
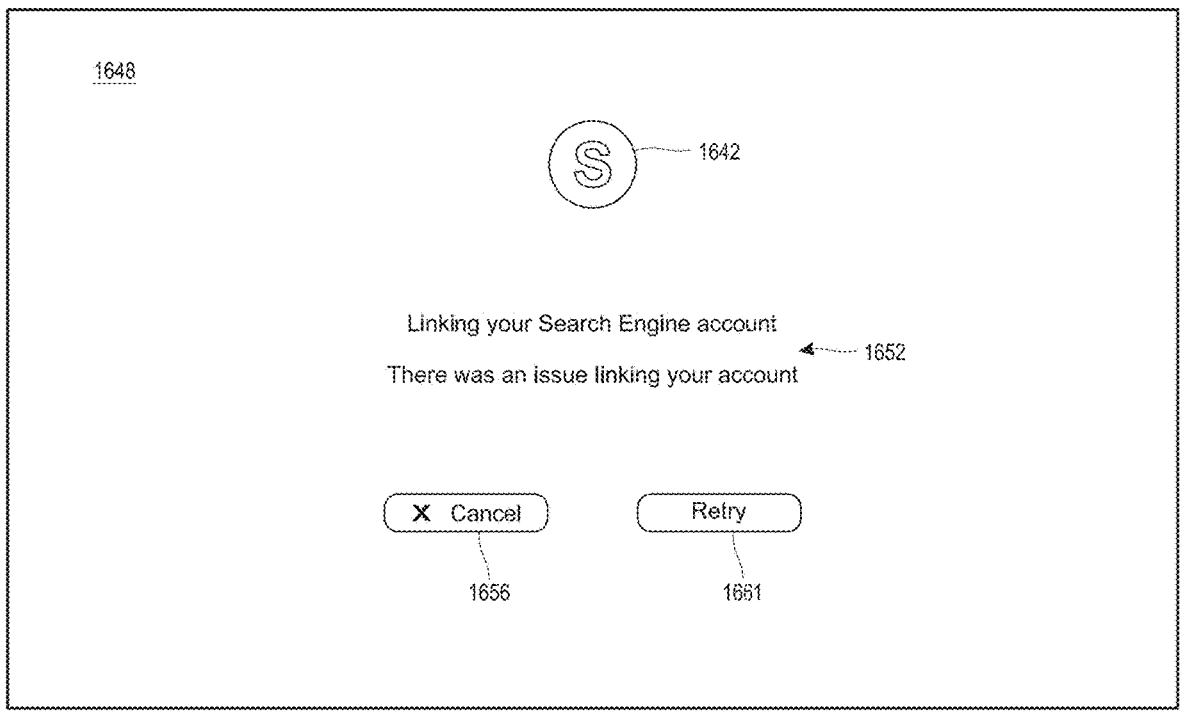

If the user chooses to continue with authorization, the window 1632 transitions to window 1640 in FIG. 16D. The third-party service may provide one or more access tokens via a dispatch sequence (described below with reference to FIGS. 18-20B) in the background. During this sequence, the front end may display the window 1640, which may show an icon 1642 representative of the service being linked (e.g., an "S" icon for SearchEngine.com) or text 1643 indicating that the authorization is proceeding. If the user wishes to cancel the authorization, he or she can select button 1644 to return to the calling application (e.g., the Game) unauthorized. In some cases, there may be an issue or problem with establishing the authorization (e.g., an incorrect username or password was entered), and the display may transition to window 1648, which may provide a textual indication 1652 that an issue occurred. The user can select button 1656 to cancel the authorization process and return to the calling application (e.g., the Game) or select button 1661 to retry the authorization process (in which case, the display may transition back to the window 1620 shown in FIG. 16C).

Figure 16F:
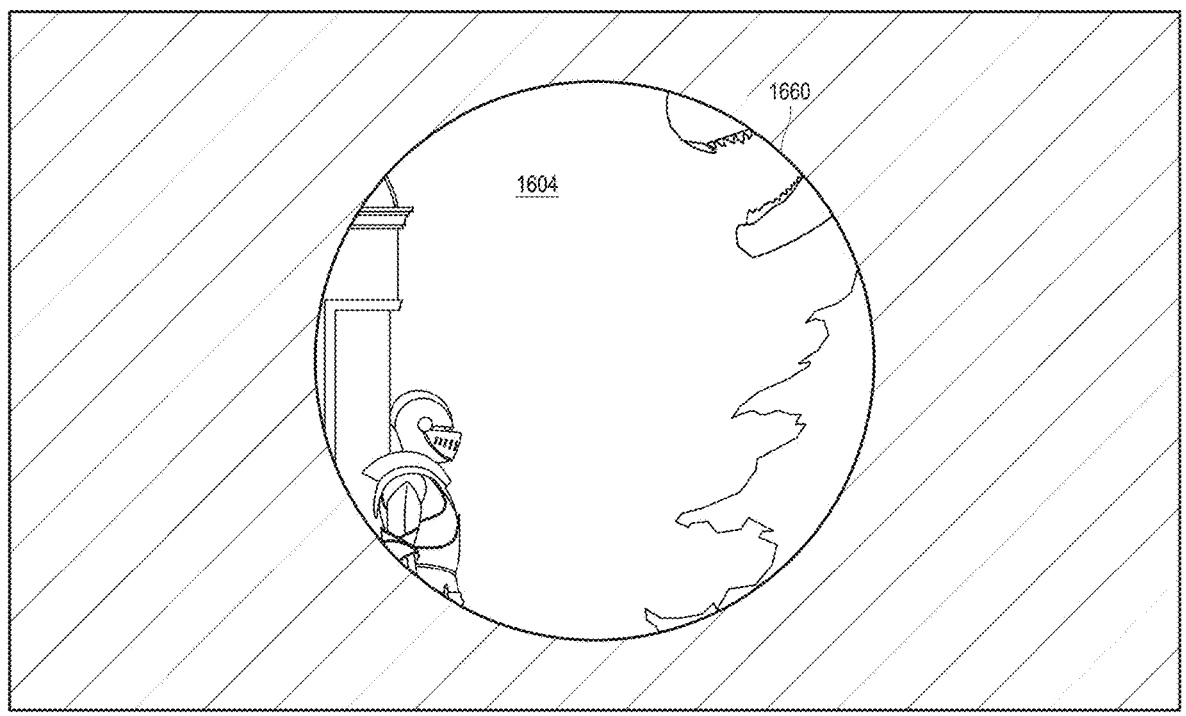

Upon successful authorization, the calling application (in this example, the Game) may be foregrounded. Other application(s) that may have been backgrounded during the authorization process may also be foregrounded. Foregrounding the application(s) can include executing the application(s) at a higher priority (as compared to when executed in the background), displaying application-specific virtual content to the user, increasing an opacity or luminance of the application-specific virtual content, decreasing a transparency of the application-specific virtual content, changing a display depth or a size of the displayed application-specific virtual content (e.g., displaying the content closer to the user or with increased size), or allowing the application(s) to receive user input. For example, as shown in FIG. 16F, the display may transition back to the game virtual content 1604 via an expanding circle 1660 that increases in size to immerse the user back into the game.

FIGS. 17A-17D illustrate various approaches to displaying authorization windows within a mixed reality environment. In these figures, the application is a landscape application such as a social media application that displays social media content 1705 to the user. In this example, a user ("Mia Leap") is online and linked to friends "Alice" and "Bob" shown in region 1706. The application may request an authentication service (e.g., an SSO services that is also accessible my other applications), such as an OAuth service from anywhere within the app. For example, if the user wants to search for additional friends that may be online, the user may select button 1708. The display transitions to window 1710, shown in FIG. 17B, which includes functionality to permit the user to search for friends (e.g., via a nickname or a phone number). The window 1710 also includes functionality to link to a third-party service to find friends that the user may know. For example, the user can select button 1712 to link to a search engine account (e.g., also referred to as SearchEngine.com in this example) that includes the user's email and contact information.

Figure 17A:
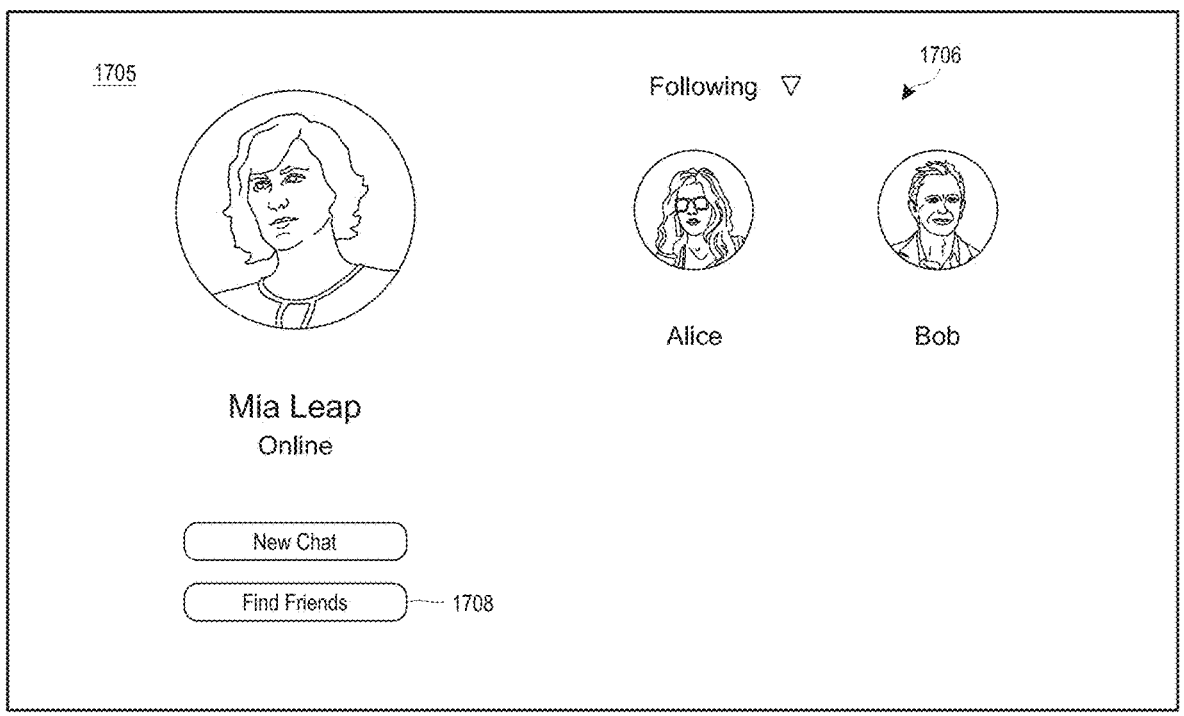
FIGS. 17A-17D illustrate various approaches to displaying authorization windows within a mixed reality environment.
Figure 17B:
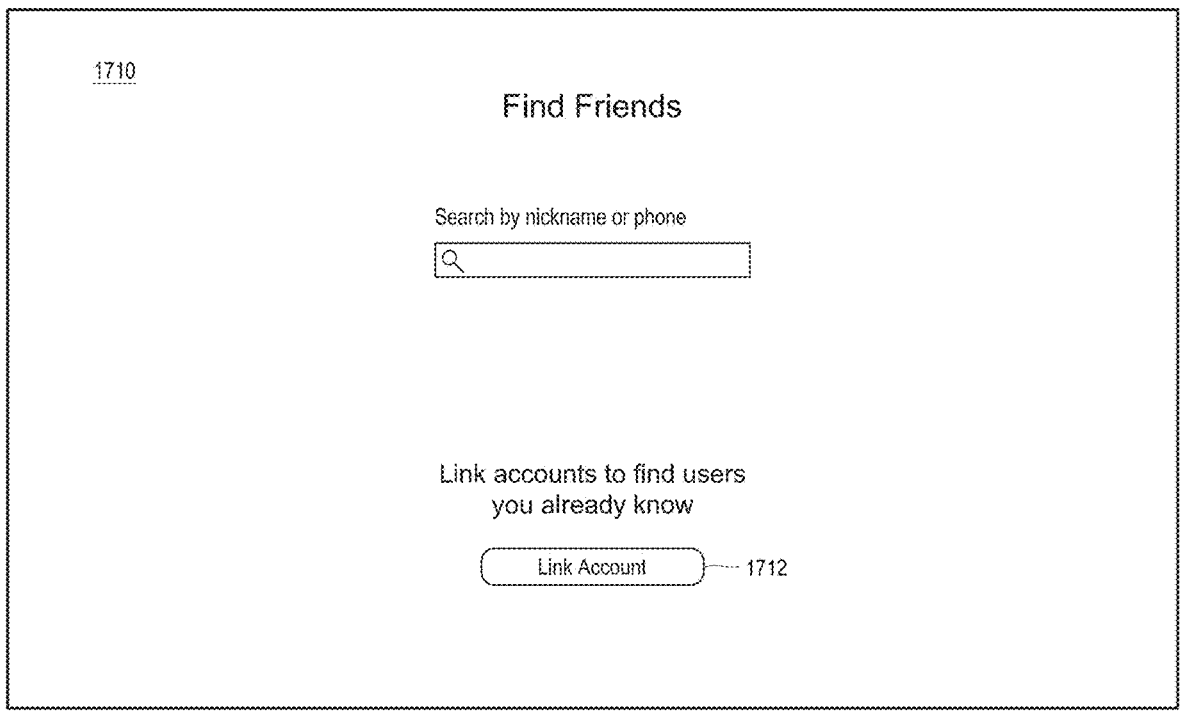
Figure 17C:
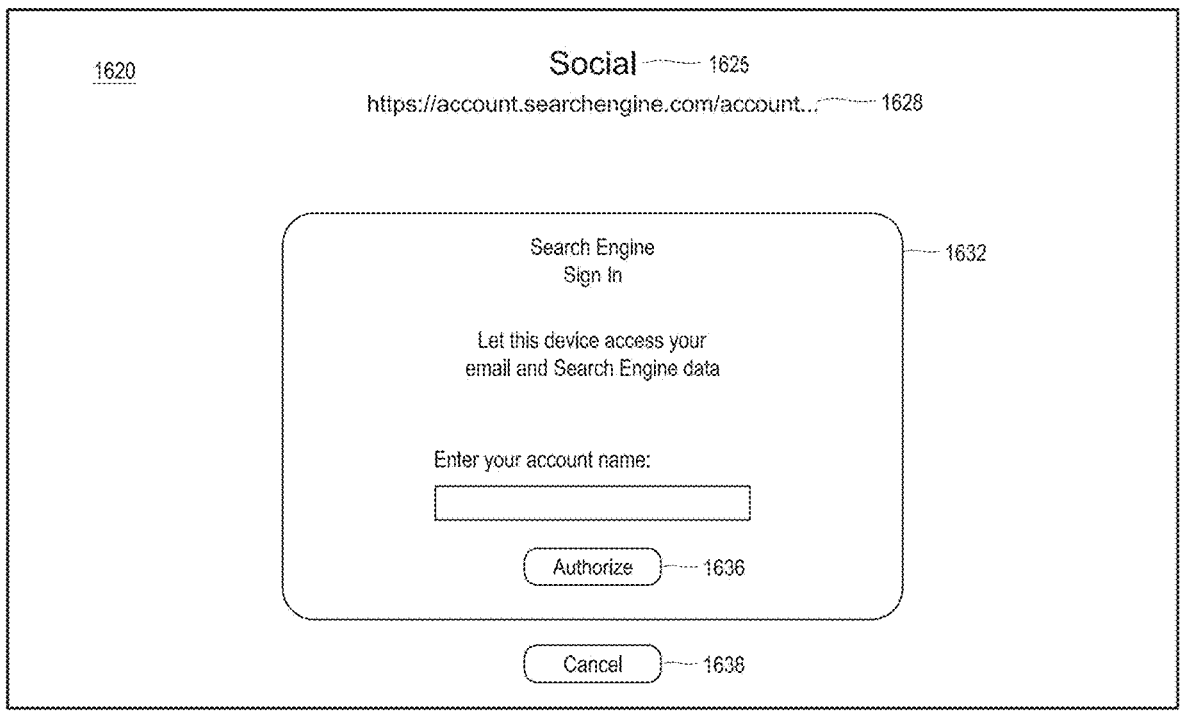
Figure 17D:
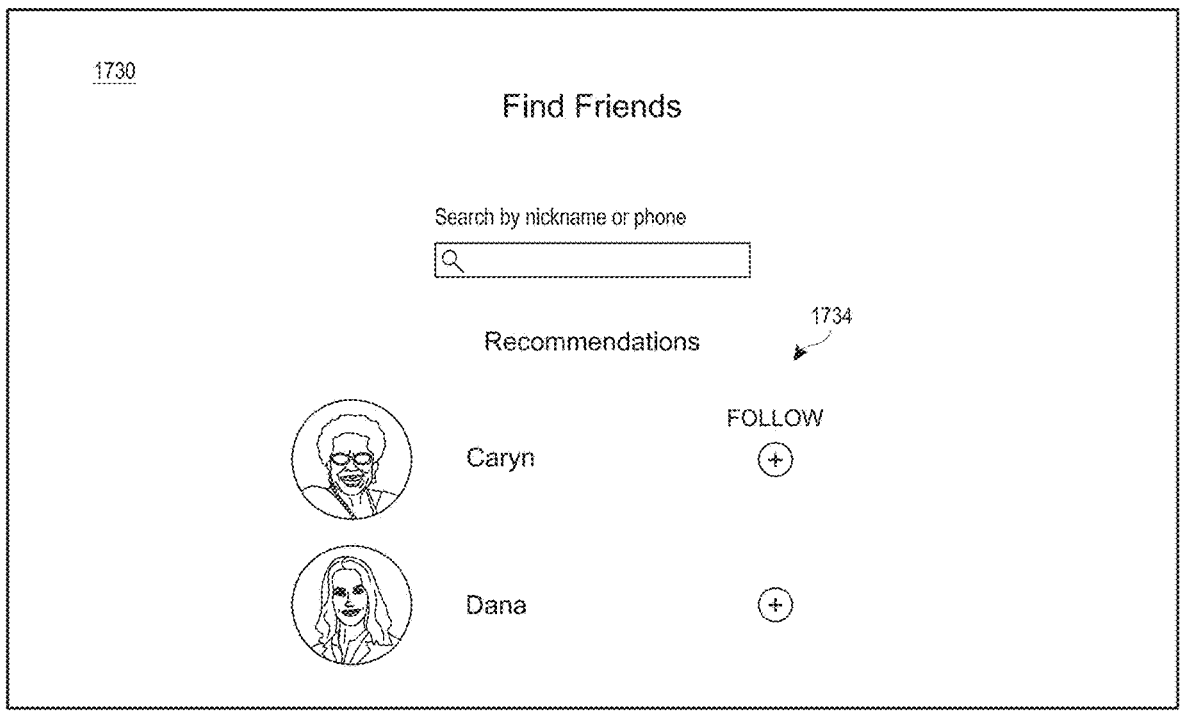

If the user selects the button 1712 (e.g. to link his or her account), the display transitions to an OAuth authorization window 1620 shown in FIG. 17C. Since the calling program is a landscape application (the social media application), the system can background the calling application and load the OAuth authorization window in an immersive mode (so that the user may only interact with the OAuth window). Other landscape application(s) (if any are running) may be temporarily hidden during the authorization process. Backgrounding the application(s) can include executing the application(s) at a lower priority (as compared to when executed in the foreground), hiding application-specific virtual content from the user, reducing an opacity or luminance of the application-specific virtual content, increasing a transparency of the application-specific virtual content, changing a display depth or a size of the displayed application-specific virtual content (e.g., displaying the content farther from the user or with decreased size), or preventing the application(s) from receiving user input. As described further herein, after the authorization process is successful (or canceled by the user), the application(s) can then be executed in the foreground.

The OAuth window 1620 shown in FIG. 17C may be generally similar to the OAuth window shown in and described with reference to FIG. 16C. For example, the name of the application requesting user authorization may be shown in region 1625. In this example, the social media program "Social" is requesting access to SearchEngine.com, whose URL is shown in the region of the web address 1628. The sign-in window 1632 permits the user to authorize access, and the user can cancel authorization by selecting the button 1638. The user may continue the authorization process generally as described above for the immersive game application.

After the OAuth protocol completes and the user has successfully authorized the third-party service, the user is returned to where he or she left off in the calling application, with the state populated based on the authorization information. Other application(s) (if any are running) may be returned to the foreground or the application's previous state. In this example, the display transitions to the Find Friends window 1730, which is now populated in region 1734 with contacts "Caryn" and "Dana" that were found by SearchEngine.com from the user's contacts. In this example, the user could elect to follow these contacts by selecting the respective "+" button.

The examples described with reference to FIGS. 16A-17D illustrate how an OAuth authorization protocol can be called by immersive or landscape applications. The OAuth window (e.g., the window 1620 shown in FIGS. 16C and 17C) may have a number of properties that may beneficially help to ensure secure, confidential authorization. The properties of the OAuth window may be generally the same (regardless of which application calls the window), which can help provide an authorization process that is uniform across all applications on the mixed reality platform and provide an easily-learned process for the user. Non-exclusive and non-limiting examples of OAuth window properties will now be described. These properties can be used alone, jointly, or in any suitable combination.

The OAuth window may be a relatively basic browser window with a limited feature set (e.g., to prevent hacking, to enhance security and confidentiality, and to avoid the user being distracted by other user interface features). For example, the window may show the name 1624 of the application requesting authorization (e.g., the Game application in FIG. 16C and the Social application in FIG. 17C). The web address 1628 of the service being linked to can be shown. A cancel button 1638 may be displayed below the authorization window 1632 so that the user can easily cancel out of any authorization process. The OAuth window may be substantially opaque so that the user can be focused on the authorization content and not distracted by other real or virtual content viewable through the display. For example, the opacity of the OAuth window may be greater than 50%, 60%, 75%, 80%, 90%, or up to 100%.

The mixed reality system may generally enable users to call up contextual menus. Once the OAuth window is displayed, the system may limit features available from contextual menus. For example, context menu commands may be hidden except for zoom controls (which can enable the user to zoom in or zoom out until the window content can be read comfortably). Extraction of objects or links from an OAuth window may be prohibited. If a user attempts to extract an object or a link, the command can be ignored. In some implementations, three-dimensional (3D) content is not displayed within an OAuth window.

The OAuth window may be made to execute in an immersive mode (rather than in a landscape mode) so that the all virtual content displayed to the user comes from the OAuth service. Accordingly, the OAuth window may be referred to as a modal window that is subordinate to the calling application's window or virtual content but disables the calling application's functionality while the authorization process proceeds. A modal, immersive OAuth window can prevent other applications from overlaying content on the OAuth window, which prevents other applications from stealing or reading user input or content. Making the OAuth window immersive or modal also prevents distractions to the user from other landscape application(s), which may have windows displayed at multiple depths from the user. In some implementations, the landscape or immersive application(s) may be suspended (e.g., paused) while the OAuth service is active, and the landscape or immersive application(s) may resume (e.g., continue where the application previously left off) when the OAuth service ends (e.g., return to the game application). In some implementations, the landscape or immersive application(s) may continue to run in the background despite the system not accepting user interactions for the landscape or immersive application(s), such that the application(s) may be in a different state when the OAuth service ends compared to when the OAuth service began (e.g., a clock application that shows the current time). By executing the OAuth process in an immersive, modal mode, the user is locked into a single task, namely, completing the authorization process via the OAuth window. Advantageously, the user cannot accidently enter input into the wrong window, because the modal OAuth window is the only window that accepts input from the user.

In the mixed reality context, in some implementations, the immersive (modal) OAuth window can be executed at any time or from any place in the requesting application. The OAuth window can be executed as a child of the requesting application (the parent application), and the child can disable access to the parent or any other application(s) until a specific OAuth process is completed (e.g., successfully signing into a third-party service, providing payment credentials, canceling out of the authorization process, etc.). Only after completion of the specific OAuth process can the parent or other application(s) be returned to. The API can be configured to give the child special permissions so that when the parent application calls for the OAuth window, the functionality, feature set, and special permissions of the OAuth window are automatically provided and access to the parent or other application(s) is automatically disabled.

Such modal functionality can be particularly beneficial in a 3D mixed reality environment where different applications can present virtual content at different depths from the user and which have different visibilities. In such an environment, a bad actor (e.g., malware) could present invisible virtual content in front of a window configured to accept user input (e.g., a password or other confidential information) and thereby intercept the user's input (without the user's knowledge). However, by making the OAuth window modal and disabling access to all other application(s), the user can safely input confidential information to the authorization process to securely log in, transfer confidential information, and so forth. Additionally, such a modal window in a 3D mixed reality environment, where access to all application(s) is blocked, is different from some modal windows implemented in a 2D mobile or desktop environment. In 2D environments, a modal window may disable access to the parent application, but the user may switch applications and continue to input user data (which could be intercepted by malware).

The mixed reality display system may present the OAuth window so that the window is always in front of the user. This may be advantageous, because it makes it more difficult for the user to lose sight of the window (e.g., within a field of view of the system or user) and the window will not be lost or partially occluded behind physical or virtual objects. In some implementations, the OAuth window may be displayed using a lazy headlock setting in which the window is attached to the user's head position so that the window moves in response to the user's head movement. For example, if the user looks left or right, the window moves left or right, respectively, to keep the window in front of the user. Likewise, if the user looks up or down, the window moves up or down, respectively, to keep the window in front of the user. Accordingly, the OAuth window moves responsively to the user's head movement and re-centers in the user's field of view. The re-centering may be associated with a short time lag so that the movement of the window feels as if it were somewhat more loosely attached to the user. An advantage of a lazy headlock setting for the OAuth window is that the system does not have to decide where to display the window in the field of view of the user; the system simply displays the window in the center of the user's field of view. Examples of various window movements usable with the OAuth service are described in U.S. Patent Publication No. 2019/0197785, which is hereby incorporated by reference herein in its entirety.

The mixed reality display system may present the OAuth window at a distance from the user that improves or optimizes legibility of text or graphic content in the window or improves or optimizes the ability of the user to enter data in the OAuth window. For example, in some implementations, the OAuth window is displayed by the mixed reality system at 700 mm from the user and has a window size of 600 mm×500 mm. In other implementations, these sizes or distance may be different, and in some implementations, the sizes or distance may be user-adjustable. As discussed above, in some implementations, contextual functionality of the window is disabled except for zoom control, which provides the use with the ability to select a suitable size of the window.

The OAuth service can be called from any application running on the mixed reality display system (e.g., via appropriate API calls). Further, the OAuth service is not limited to the game and social media examples described with reference to FIGS. 16A-17D and may be used with other applications or use cases. For example, an application developer may wish to add secure authentication to its mixed reality application (landscape or immersive) and use any backend authentication server it desires. The developer may also wish to enable cookies to be set for access control (e.g., single sign-on (SSO)) or other analytics. The application developer can enable this functionality with calls to the OAuth API. An advantage of the ability of the developer to make OAuth API calls from anywhere within the mixed reality application is that it keeps the user engaged with the mixed reality application, because authentication becomes integrated within the flow of the mixed reality application.

As another example, an application developer for an immersive ecommerce application may wish to be able to close a sale for an item by showing a modal browser window from the ecommerce website or track impressions via cookies between visits to the ecommerce website directly from the immersive application or from browser searches. The developer may also wish to buy or show advertising for items through cookies set from the immersive application or ensure that users are directed back to the immersive application after purchasing the item (e.g., rather than being directed back to landscape applications). In such a scenario, the developer can utilize the OAuth API to provide a suitable modal window callable from inside the immersive mixed reality application.

In another application, a developer may wish to show some sort of formatted text in a modal window. For example, the developer may wish to display to the user an end-user license agreement (EULA) for a landscape or immersive mixed reality application. The developer may wish to use hypertext markup language (html) to format the EULA, present it as a browser window, and have the EULA respect different locales for translation. The developer may wish to be able to update the EULA remotely from a server. In such a scenario, the developer can have the EULA be presented in a modal window so that the user must page through the EULA and indicate consent before being returned to the mixed reality application. The user's acceptance or denial of the EULA can be communicated to the calling application.

Figure 18:
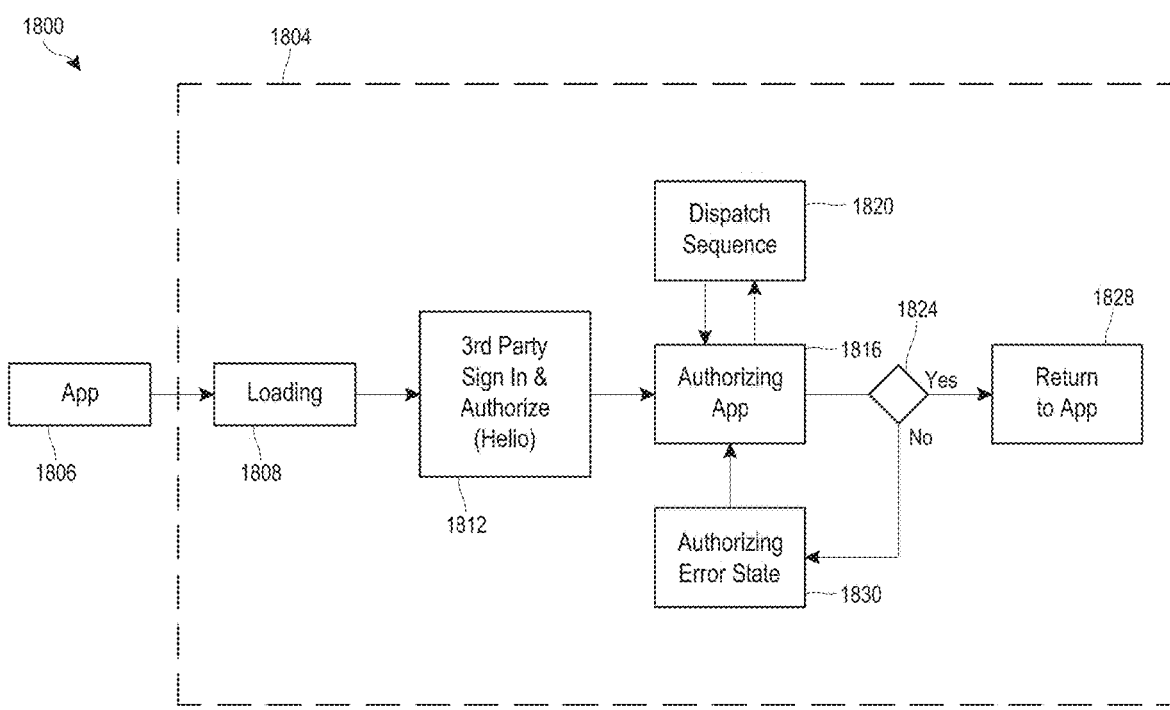
FIG. 18 is a block diagram showing an example of an immersive (e.g., modal) authorization service.

FIG. 18 is a block diagram 1800 showing an example of an immersive (e.g., modal) OAuth authorization service 1804. The OAuth service 1804 can implement the functionality described with reference to FIGS. 16A-17D and can be performed, for example, by the processor 170 of the head-mounted display system 160 described with reference to FIG. 1 or the computing system 1400 described with reference to FIG. 15. The OAuth service 1804 can be a web-based service that authorizes or validates the user's information and provides an access token to authorize a user.

An application 1806 (app) can request the OAuth service 1804 from anywhere within the application (e.g., by an API call). The application 1806 can be a landscape application or an immersive application. Initiating the OAuth service 1804 transitions the display system to an immersive web browser instance (e.g., a Helio instance) to begin the authorization process. As described above, an immersive (e.g., modal) web browser instance may provide consistency in the user's authorization experience, because all applications on the display system utilize the OAuth service 1804, which can lead to the user trusting that the authorization process is secure. As described above, an immersive mode disables other application(s) that may be running, which can prevent a malicious application (malware) from intercepting user input during the authorization process. Thus, the immersive mode can prevent man in the middle attacks.

At block 1808, while the OAuth service is loading, the system backgrounds the requesting application 1806 (and other application(s) that may be running) and may display one or more windows requesting the user to consent to the authorization process (e.g., the window 1610 described with reference to FIG. 16A). At block 1812, the system may then transition the display to a window for the OAuth authorization process. Examples of the OAuth authorization window are shown and described with reference to the windows 1620 in FIGS. 16C and 17C. The authorization may include a sign-in page for the requested third-party service, a page to enter payment information, and so forth.

At block 1816, the OAuth service 1804 continues the authorization process. For example, during authorization, the system may display a window indicating to the user that the authorization process is ongoing (e.g., the window 1640 described with reference to FIG. 16D). The window may permit the user to cancel the authorization process (e.g., by selecting a cancel button 1644), and the OAuth service 1804 will terminate and the user will be returned to the requesting application 1806.

At block 1820, a dispatch sequence can execute in the background. The dispatch sequence can be performed by a dispatch service described below with reference to FIG. 19. The dispatch service is used to share data between applications and to provide for application-to-application communication. The dispatch sequence may communicate user information (e.g., username, password, payment credentials, etc.) to the third-party service and receive access tokens from the third-party service.

At block 1824, if the authorization process with the third-party service is successful, the user at block 1828 is returned back to the requesting application 1806. At block 1824, if the authorization is not successful, the OAuth service 1804 passes to block 1830, which indicates an error state in the authorization process. For example, a window (e.g., the window 1648 described with reference to FIG. 16E) may be displayed to indicate to the user there was an error in the authorization process. The user can choose to cancel out of the OAuth process without continuing to authorize the third-party service (e.g., by selecting the cancel button 1656), in which case, the user will be returned to the requesting application 1806 and the OAuth process will terminate. Alternatively, the user can choose to retry the authorization (e.g., by selecting the retry button 1661), and the OAuth process will return to block 1816 to retry the authorization.

Figure 19:
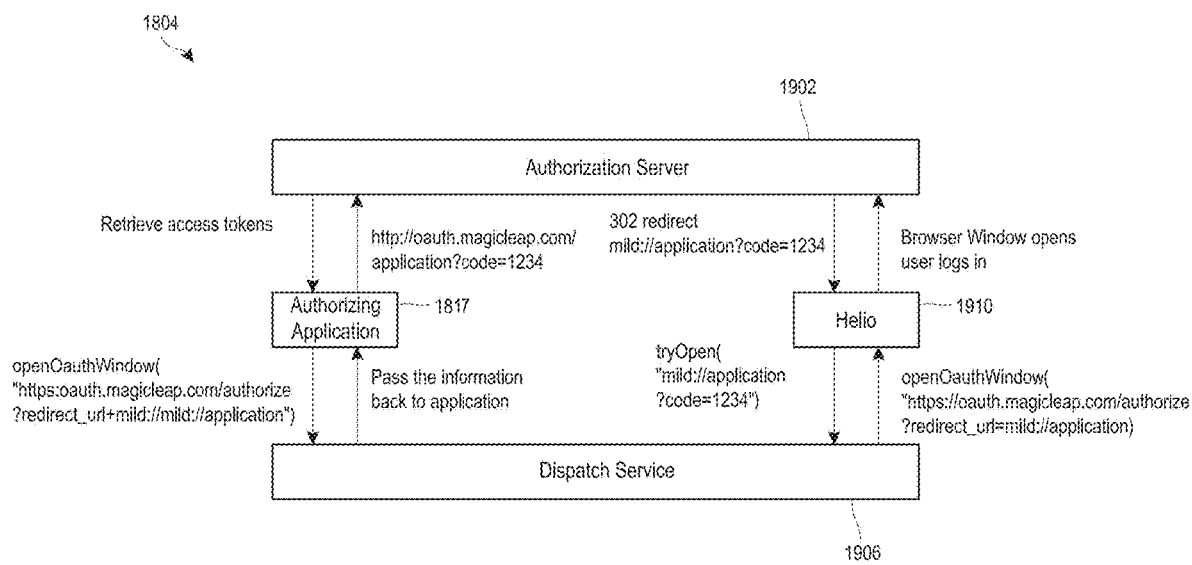
FIG. 19 is a block diagram of an example system architecture for the authorization service.

FIG. 19 is a block diagram of an example system architecture for the OAuth authorization service 1804. In this illustrative example, the system architecture includes an authorization server 1902, a dispatch service 1906, the authorizing application 1817, and a mixed reality browser 1910 (e.g., an instance of the Helio browser). The dispatch service 1906 is responsible for passing data between different applications. The mixed reality browser 1910 is responsible for web page navigation and rendering. The browser 1910 may, but need not, use cryptographic mechanisms.

FIG. 19 shows examples of types of messaging that may occur among these components of the OAuth service 1804. For example, an application or service can attempt to perform an OAuth authorization by calling openOauthWindow(url) from the dispatch service 1906. The argument url of the function call includes a redirect url (uniform resource locator) that has a schema identifying the application itself and that the dispatch service is able to recognize.

Upon receiving this call, the dispatch service 1906 calls openOauthWindow(url) to have the web browser 1910 open a browser window. The browser window that opens can be a special window, for example, without a url bar. Examples of this special browser window are the windows 1620 shown and described with reference to FIGS. 16C and 17C. As described herein, the browser window can be lazy head-locked to the user's headpose so that the window is always in front of the user.

Once the user enters his or her credentials and the authorization service indicates a match, an http response status code (e.g., a 302 redirect) can be intercepted by the browser 1910 and the dispatch service 1906 can be called with the application url and the authorization code (e.g., "1234" in FIG. 19). For example, the dispatch service 1906 can be called using tryOpen( ), and the browser window may then close. The dispatch service 1906 can call the application that matches the schema, and the application performs the following action in the OAuth authorization, which is to call the authorization servers and exchange the authorization code for the access tokens.

The OAuth service 1804 can provide one or more system or kernel exported libraries. For example, a libdispatchservice can be used to access the dispatch service 1906 via the tryOpen( ) API call. As another example, a libservice_connector can be used to initialize and handle service registration.

The API provided to developers can include inter-process exported APIs and inter-process imported APIs. For example, the web browser 1910 (e.g., Helio) can be opened with the openOAuthWindow call using library or kernel exported APIs.

| Function or API Name | Credentials or Privileges | Used by processes | Usage + Validation |
|---|---|---|---|
| openOauthWindow | OAuthWindow | Dispatch Service | |

The libdispatchservice can include the following inter-process exported API.

| Function or API Name | Credentials or Privileges | Used by processes | Usage + Validation |
|---|---|---|---|
| openOauthWindow | OAuthAuthorization | Applications | |

The libdispatchservice can include the following inter-process imported API.

| Function or API Name | Credentials or Privileges | Used by processes | Usage + Validation |
|---|---|---|---|
| tryOpen | None | Helio | |

Figure 20A:
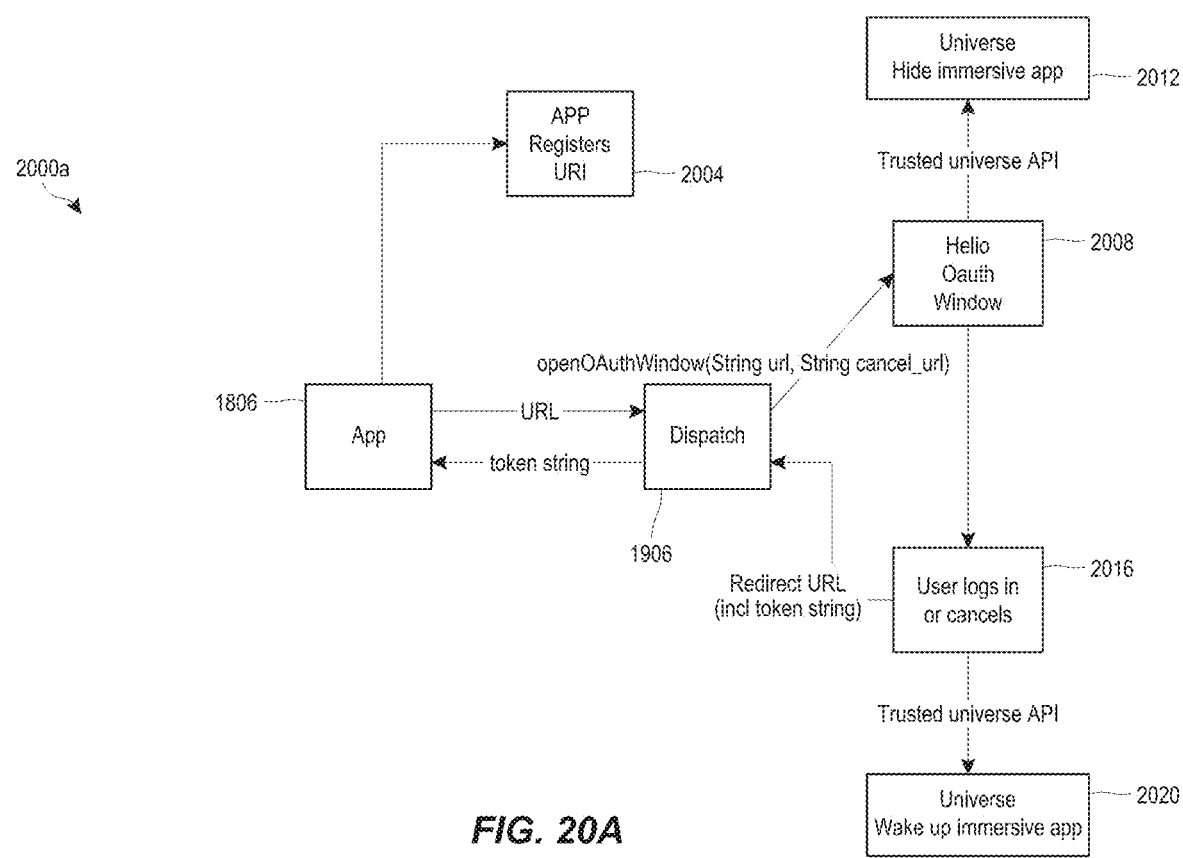
FIG. 20A illustrates an example of an authorization flow for application developers.

FIG. 20A illustrates an example of an authorization flow 2000a for application developers. In this example, at 2004 the application 1806 registers a uniform resource identifier (URI) having a schema identifying the application itself and that the dispatch service 1906 is able to recognize. A URI may include a string of characters used to identify a name or a resource and enables interaction with representations of the resource over a network (e.g., the World Wide Web or the Internet) using specific protocols. A URI may also identify a device-specific resource such as a specific user interface context in an application, for example, the settings page of an application. A uniform resource locator (URL) can be a subset of the URI that specifies where an identified resource is available and the mechanism for retrieving the resource. As an example, to identify a specific resource and how to access the resource, a URI for a structured query language (SQL) database might be: mysql://localhost@databasename:password. The URL can identify where the database can be found on the network and which protocol should be used. The URL associated with this example might be: mysql://localhost.

The application can perform an OAuth authorization by requesting the dispatch service 1906 to call openOAuthWindow to open a web browser OAuth window 2008. Arguments of this function call are the registered URL for the application and a cancel url. The web browser window can use a trusted Universe API call to hide the application (e.g., to background it). In some implementations, the Universe may comprise one or more sets of software code that manages the placement and display of virtual content for a display system in the user's environment. In some implementations, the Universe may accept a scene graph from a different part (e.g., component or module) of the display system for placement in the user's environment. The user continues at 2016 to, for example, log in to the third-party service or cancel out of the authorization process. A redirect URL including an access token is passed back to the dispatch service 1906. The application is woken up at 2020 and the access token is passed back to the requesting application 1806 by the dispatch service 1906.

Figure 20B:
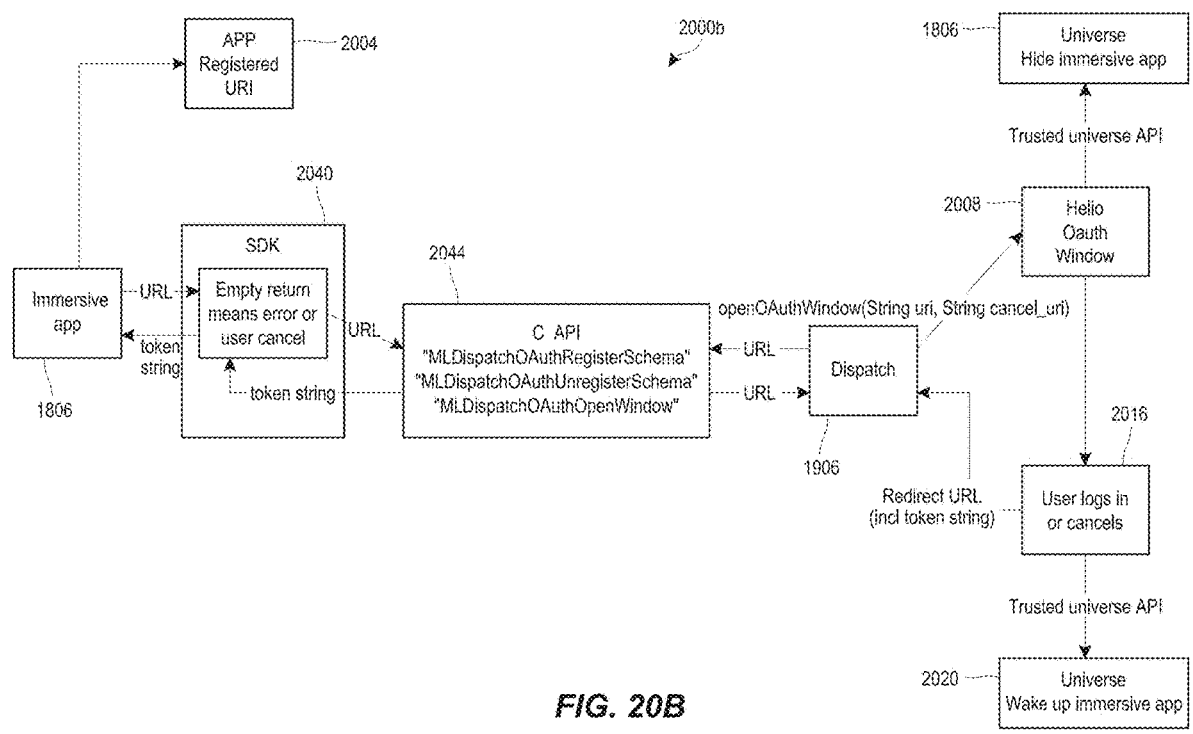
FIG. 20B illustrates an example of an authorization flow for application developers using a software development kit (SDK).

FIG. 20B illustrates an example of an authorization flow 2000b for application developers using a software development kit (SDK). The example flow 2000b is generally similar to the example flow 2000a described with reference to FIG. 20A. However, in this example, an SDK 2040 and a C API 2044 are provided.

Example Implementations

The systems, methods, and devices described herein each have several aspects, no single one of which is solely responsible for its desirable attributes. Without limiting the scope of this disclosure, several non-limiting features will now be discussed briefly. The following paragraphs describe various example implementations of the devices, systems, and methods described herein. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Example One

A display system for displaying virtual content in a three-dimensional (3D) spatial environment, the display system comprising: a head-mounted display configured to present virtual content to an eye of a user of the display system; and circuitry in communication with the head-mounted display, the circuitry configured to: execute an application configured to present application-specific virtual content to the user; receive an authorization request from the application to authorize the user with a web service; background the application; execute an authorization service configured to: cause the head-mounted display to present to the user a modal authorization window configured to accept user input and to prevent the application or other applications from receiving the user input; receive the user input associated with authorization by the web service; communicate the user input to the web service; receive an access token from the web service, the access token indicative of successful authorization by the web service; and communicate the access token to the application; terminate the authorization service; and foreground the application.

Example Two

The display system of Example one, wherein the application comprises an immersive application.

Example Three

The display system of Example one or Example two, wherein the head-mounted display is configured to present the application-specific virtual content and not to display to virtual content generated by other applications executed by the display system.

Example Four

The display system of any one of Examples one to three, wherein the application comprises a landscape application.

Example Five

The display system of any one of Examples one to four, wherein the head-mounted display is configured to present the application-specific virtual content and also to display to virtual content generated by other applications executed by the display system.

Example Six

The display system of any one of Examples one to five, wherein the circuitry is configured to receive the authorization request from the application at any point during execution of the application.

Example Seven

The display system of any one of Examples one to six, wherein said backgrounding the application comprises causing the circuitry to perform one or more of: execute the application at a lower priority, hide the application-specific virtual content, reduce an opacity or luminance of the application-specific virtual content, increase a transparency of the application-specific virtual content, increase a display depth of the application-specific virtual content, decrease a size of the application-specific virtual content, or prevent the application from receiving user input.

Example Eight

The display system of any one of Examples one to seven, wherein said foregrounding the application comprises causing the circuitry to perform one or more of: execute the application at a higher priority, display the application-specific virtual content, increase an opacity or luminance of the application-specific virtual content, decrease a transparency of the application-specific virtual content, decrease a display depth of the application-specific virtual content, increase a size of the application-specific virtual content, or allow the application to receive user input.

Example Nine

The display system of any one of Examples one to eight, wherein the head-mounted display is configured to display the modal authorization window in a lazy headlock setting.

Example Ten

The display system of any one of Examples one to nine, wherein the head-mounted display is configured to display the modal authorization window at a position that moves in response to a head movement of the user.

Example Eleven

The display system of Example ten, wherein the position is directly in front of the user.

Example Twelve

The display system of Example ten or Example eleven, wherein the position corresponds to a distance from the user such that text or graphics in the modal authorization window is legible to the user.

Example Thirteen

The display system of any one of Examples one to twelve, wherein the modal authorization window depicts one or more of: a name of the application, at least a portion of a web address of the web service, a selectable user-input feature for canceling the authorization request, or an authorization window from the web service.

Example Fourteen

The display system of Example thirteen, wherein the modal authorization window is configured to display a full web address of the web service upon receipt of a first user input.

Example Fifteen

The display system of Example thirteen, wherein the modal authorization window is configured to display a scrollbar configured to allow the user to scroll through the web address of the web service.

Example Sixteen

The display system of any one of Examples twelve to fifteen, wherein the authorization window from the web service comprises one or more of: a sign-on window, a window configured to accept a user password, or a window configured to accept user payment credentials.

Example Seventeen

The display system of any one of Examples one to sixteen, wherein the modal authorization window comprises a web browser window.

Example Eighteen

The display system of any one of Examples one to seventeen, wherein the authorization service is executed as a child of the application.

Example Nineteen

The display system of any one of Examples one to eighteen, wherein the authorization service is called from the application via an application programming interface (API) call.

Example Twenty

The display system of any one of Examples one to nineteen, wherein the authorization service is called from the application via a software development kit (SDK) call.

Example Twenty-One

The display system of any one of Examples one to twenty, wherein the web service is a third-party web service accessed remotely from the display system.

Example Twenty-Two

A method for authorizing a user of a mixed reality display system, the method comprising: receiving a request from an application executing on the mixed reality display system to authorize the user with a web service; displaying to the user an authorization window configured to accept user input associated with authorization by the web service and to prevent the application or other applications from receiving the user input; communicating the user input to the web service; receiving an access token from the web service, the access token indicative of successful authorization by the web service; and communicating the access token to the application.

Example Twenty-Three

The method of Example twenty-two, wherein the application comprises an immersive application or a landscape application.

Example Twenty-Four

The method of Example twenty-two or Example twenty-three, further comprising backgrounding the application prior to displaying to the user the authorization window and foregrounding the application after receiving the access token from the web service.

Example Twenty-Five

The method of any one of Examples twenty-two to twenty-four, wherein the authorization window comprises a modal window.

Example Twenty-Six

The method of any one of Examples twenty-two to twenty-five, wherein the authorization window is a child of the application.

Example Twenty-Seven

A method for authorizing a user of a mixed reality display system, the method comprising: executing an application on the mixed reality display system, the application generating application-specific virtual content for display to the user; registering a web address associated with the application; displaying to the user a modal authorization window while hiding the application-specific virtual content from display to the user; receiving a web response status code in response to user input entered via the modal authorization window; and communicating the web response status code to the application using the web address associated with the application.

Example Twenty-eight

The method of Example twenty-seven, wherein the application comprises an immersive application or a landscape application.

Example Twenty-Nine

The method of Example twenty-seven or Example twenty-eight, wherein hiding the application-specific virtual content comprises one or more of: not displaying the application-specific virtual content, reducing opacity or luminance of the application-specific virtual content, increasing transparency of the application-specific virtual content, increasing display depth of the application-specific virtual content, decreasing a size of the application-specific virtual content, or displaying the modal authorization window in an immersive mode.

Example Thirty

The method of any one of Examples twenty-seven to twenty-nine, wherein the modal authorization window prevents the application or other applications from receiving the user input.

Example Thirty-One

The method of any one of Examples twenty-seven to thirty, wherein the modal authorization window is a child of the application.

Example Thirty-Two

The method of any one of Examples twenty-seven to thirty-one, further comprising providing a software development kit configured to provide communication between the application and the modal authorization window.

Example Thirty-Three

The method of any one of Examples twenty-seven to thirty-two, further comprising, after communicating the web response status code to the application, hiding the modal authorization window; and displaying the application-specific virtual content to the user.

Example Thirty-Four

The method of Example thirty-three, wherein hiding the modal authorization window comprises one or more of: not displaying the modal authorization window, reducing an opacity or luminance of the modal authorization window, increasing a transparency of the modal authorization window, increasing a display depth of the modal authorization window, decreasing a size of the modal authorization window.

As noted above, implementations of the described examples provided above may include hardware, a method or process, and/or computer software on a computer-accessible medium.

Further Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process blocks or steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some implementations, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example implementations. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every implementation.

Conditional language used herein, such as, among others, "can," "could," "might," "may," "e.g.," and the like, unless specifically stated otherwise, or otherwise understood within the context as used, is generally intended to convey that certain implementations include, while other implementations do not include, certain features, elements, blocks, and/or steps. Thus, such conditional language is not generally intended to imply that features, elements, blocks and/or steps are in any way required for one or more implementations or that one or more implementations necessarily include logic for deciding, with or without author input or prompting, whether these features, elements, blocks and/or steps are included or are to be performed in any particular implementation. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain implementations require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A display system for displaying virtual content in a three-dimensional (3D) spatial environment, the display system comprising:
a head-mounted display configured to present virtual content to an eye of a user of the display system; and
circuitry in communication with the head-mounted display, the circuitry configured to:
execute an application configured to present application-specific virtual content to the user;
receive an authorization request from the application to authorize the user with a web service;
background the application, including increasing a display depth of the application-specific virtual content being displayed in the 3D spatial environment;
execute, by the head-mounted display, an authorization service configured to:
determine a web address associated with the web service;
cause the head-mounted display to present to the user a modal authorization window associated with the web address, wherein the modal authorization window is configured to accept user input including authentication credentials, wherein the modal authorization window is presented at a depth in the 3D spatial environment that is less than the display depth of the application-specific virtual content while the application is backgrounded, and wherein, while the modal authorization window is presented, the application is disabled from receiving any user input and access to all other applications in the 3D spatial environment is disabled;
authorize the user input;
in response to authorizing the user input, generate a web response status code;
communicate the web response status code to the web service, wherein the authorization service is configured to also provide the web response status code to the web service in response to a second authorization request from a second application;
receive an access token from the web service, the access token indicative of successful authorization by the web service; and
communicate the access token to the application;
terminate the authorization service; and
foreground the application, including decreasing the display depth of the application-specific virtual content being displayed in the 3D spatial environment.

2. The display system of claim 1, wherein the application comprises an immersive application.

3. The display system of claim 1, wherein the head-mounted display is configured to present the application-specific virtual content and not to display virtual content generated by other applications executed by the display system.

4. The display system of claim 1, wherein the application comprises a landscape application.

5. The display system of claim 1, wherein the head-mounted display is configured to present the application-specific virtual content and also to display virtual content generated by other applications executed by the display system.

6. The display system of claim 1, wherein said backgrounding the application further comprises causing the circuitry to perform one or more of: execute the application at a lower priority, hide the application-specific virtual content, reduce an opacity or luminance of the application-specific virtual content, increase a transparency of the application-specific virtual content, or decrease a size of the application-specific virtual content.

7. The display system of claim 1, wherein said foregrounding the application further comprises causing the circuitry to perform one or more of: execute the application at a higher priority, display the application-specific virtual content, increase an opacity or luminance of the application-specific virtual content, decrease a transparency of the application-specific virtual content, increase a size of the application-specific virtual content, or allow the application to receive user input.

8. The display system of claim 1, wherein the head-mounted display is configured to display the modal authorization window in a lazy headlock setting.

9. The display system of claim 1, wherein the head-mounted display is configured to display the modal authorization window at a position that moves in response to a head movement of the user.

10. The display system of claim 9, wherein the modal authorization window from the web service comprises one or more of: a sign-on window, a window configured to accept a user password, or a window configured to accept user payment credentials.

11. The display system of claim 1, wherein the authorization service is executed as a child of the application.

12. The display system of claim 1, wherein the authorization service is called from the application via an application programming interface (API) call.

13. The display system of claim 1, wherein the web service is a third-party web service accessed remotely from the display system.

14. A method for authorizing a user of a mixed reality display system configured to display virtual content in a three-dimensional (3D) spatial environment, the method comprising:
receiving a request from an application executing on the mixed reality display system to authorize the user with a web service;
backgrounding the application, including increasing a display depth of application-specific virtual content for the application that is being displayed in the 3D spatial environment;
displaying to the user an authorization window configured to accept user input including authentication credentials associated with authorization by the web service, wherein the authorization window is displayed, by the mixed reality display system, to the user at a depth in the 3D spatial environment that is less than a display depth at which the mixed reality display system displays the application-specific virtual content for the application, and wherein, while the authorization window is presented, the application is disabled from receiving any user input and access to all other applications in the 3D spatial environment is disabled;
authorizing the user input;
in response to authorizing the user input, generating a web response status code;
communicating the web response status code to the web service, wherein the mixed reality display system is configured to also provide the web response status code to the web service in response to a second authorization request from a second application;
receiving an access token from the web service, the access token indicative of successful authorization by the web service;

communicating the access token to the application; and foregrounding the application, including decreasing the display depth of the application-specific virtual content being displayed in the 3D spatial environment.

15. The method of claim 14, wherein the backgrounding of the application is prior to displaying to the user the authorization window.

16. The method of claim 15, wherein the authorization window comprises a modal window.

17. The method of claim 15, wherein the authorization window is a child of the application.

18. A method for authorizing a user of a mixed reality display system configured to display virtual content in a three-dimensional (3D) spatial environment, the method comprising:

executing an application on the mixed reality display system, the application generating application-specific virtual content that is displayed by the mixed reality display system to the user in the 3D spatial environment;

registering a web address of a web service associated with the application;

displaying to the user a modal authorization window while hiding the application-specific virtual content from display to the user, wherein hiding the application-specific virtual content includes increasing a display depth of the application-specific virtual content being displayed in the 3D spatial environment, and wherein the modal authorization window is presented at a depth in the 3D spatial environment that is less than the display depth of the application-specific virtual content while the application-specific virtual content is hidden, and wherein, while the modal authorization window is presented, the application is disabled from receiving any user input and access to all other applications in the 3D spatial environment is disabled;

receiving a web response status code in response to user input entered via the modal authorization window, wherein the user input includes authentication credentials, and wherein the web response status code is provided to the web service via a dispatch service;

providing, by the dispatch service, the web response status code to the application;

receiving from the application a request to authorize the user;

generating an access token for the application in exchange for the web response status code provided to the application, wherein the access token indicates a successful authorization by the web service;

communicating the access token to the application using the web address associated with the application; and foregrounding the application, including decreasing the display depth of the application-specific virtual content being displayed in the 3D spatial environment.

19. The method of claim 18, wherein hiding the application-specific virtual content further comprises one or more of: not displaying the application-specific virtual content, reducing opacity or luminance of the application-specific virtual content, increasing transparency of the application-specific virtual content, decreasing a size of the application-specific virtual content, or displaying the modal authorization window in an immersive mode.

* * * * *